(12) United States Patent
Bartrom et al.

(10) Patent No.: US 11,877,540 B2
(45) Date of Patent: Jan. 23, 2024

(54) TRAY AND TRELLIS SYSTEM FOR AN AUTOMATED FARM WITH ROBOTS WORKING ON PLANTS

(71) Applicants: Michael Bartrom, Marion, IN (US); Ted R. E. Martin, Russiaville, IN (US); Brett A. Roberts, Fairmount, IN (US)

(72) Inventors: Michael Bartrom, Marion, IN (US); Ted R. E. Martin, Russiaville, IN (US); Brett A. Roberts, Fairmount, IN (US)

(*) Notice: Subject to any disclaimer, the term of this patent is extended or adjusted under 35 U.S.C. 154(b) by 291 days.

(21) Appl. No.: 17/245,034

(22) Filed: Apr. 30, 2021

(65) Prior Publication Data

US 2021/0243967 A1    Aug. 12, 2021

Related U.S. Application Data

(63) Continuation-in-part of application No. 17/210,701, filed on Mar. 24, 2021, which is a continuation of
(Continued)

(51) Int. Cl.
*A01G 9/12* (2006.01)
*A01G 17/08* (2006.01)
*B25J 15/00* (2006.01)

(52) U.S. Cl.
CPC ............ *A01G 17/08* (2013.01); *A01G 9/12* (2013.01); *B25J 15/00* (2013.01)

(58) Field of Classification Search
CPC .......... A01G 9/12; A01G 17/06; A01G 17/08; A01G 13/02; A01G 9/1438
(Continued)

(56) References Cited

U.S. PATENT DOCUMENTS 811,276 A * 1/1906 Cooper .................. A01G 9/12
47/45
1,980,239 A * 11/1934 Vetter .................. A01G 9/1423
403/207
(Continued)

FOREIGN PATENT DOCUMENTS

CN      102084786 A    6/2011
CN      105724081 A    7/2016
(Continued)

OTHER PUBLICATIONS

Machine translation of DE-202004011282-U1 to Eggers, published Jan. 2006. (Year: 2005).*
(Continued)

*Primary Examiner* — Kathleen I Alker

(57) ABSTRACT

A Tray and Trellis System includes vertical posts or legs, longitudinal members, and cross members. Combs include tines fixed at one end to longitudinal members on one side, and releasably engaged at their other end to other longitudinal members on the other side. Further combs include tines fixed to a cross member at one end, and releasably engaged to another cross member at the other end. There may be intermediate cross members having tines fixed to them and other tines releasably engaged to them. Fixation of the tines may be by clips, rings, welding, bonding, fastening, or by molding as a single piece. The releasably engaged ends of the tines may be engaged with snap-fit slot features in the longitudinal members, the cross members, or the clips or rings, or may be engaged with open grommets inserted into openings in the longitudinal members or cross members.

20 Claims, 39 Drawing Sheets

Related U.S. Application Data application No. PCT/US2020/013342, filed on Jan. 13, 2020.

(60) Provisional application No. 62/917,017, filed on Nov. 14, 2018.

(58) Field of Classification Search
USPC .......................... 47/70, 29.5, 31, 44, 45, 47
See application file for complete search history.

(56) References Cited

U.S. PATENT DOCUMENTS

| | | | | |
|---|---|---|---|---|
| 2,571,483 | A | * | 10/1951 | Pope .................. A01C 5/02 47/1.01 R |
| 4,815,394 | A | | 3/1989 | Ettlinger |
| 6,234,444 | B1 | * | 5/2001 | Haddad ................ A01G 9/122 248/533 |
| 6,554,232 | B1 | | 4/2003 | Macris |
| 7,854,108 | B2 | | 3/2010 | Koselka |
| 8,474,178 | B2 | * | 7/2013 | Kassouni ............... A01G 9/12 47/45 |
| 9,357,718 | B1 | | 6/2016 | Lehman |
| 10,098,293 | B2 | | 10/2018 | Tinsley |
| 10,617,069 | B2 | | 4/2020 | MacDonald |
| 11,178,825 | B2 | * | 11/2021 | Ahl ...................... A01G 9/12 |
| 2006/0112630 | A1 | | 6/2006 | Kimes |
| 2014/0283452 | A1 | | 9/2014 | Dittman |
| 2015/0101248 | A1 | | 4/2015 | Adkinson |
| 2016/0212948 | A1 | | 7/2016 | McGuire |
| 2016/0338276 | A1 | | 11/2016 | Speidell et al. |
| 2017/0064912 | A1 | | 3/2017 | Tabakman et al. |
| 2017/0258017 | A1 | | 9/2017 | Scaletta |
| 2017/0325427 | A1 | | 11/2017 | Straight et al. |
| 2018/0064038 | A1 | | 3/2018 | Niccoli |

FOREIGN PATENT DOCUMENTS

| | | | | | |
|---|---|---|---|---|---|
| CN | 209345704 | U | * | 9/2019 | ............. A01G 17/06 |
| CN | 111869500 | A | | 11/2020 | |
| DE | 10302523 | A1 | * | 4/2004 | ............... A01G 9/12 |
| DE | 202004011282 | U1 | * | 1/2006 | ............... A01G 9/12 |
| FR | 2919463 | A1 | * | 2/2009 | ............... A01G 9/12 |
| JP | 8-140478 | | | 6/1996 | |
| WO | WO2017/181127 | A1 | | 10/2017 | |
| WO | WO2018/213606 | A1 | | 11/2018 | |
| WO | WO2020/039153 | A1 | | 2/2020 | |

OTHER PUBLICATIONS

Machine translation of CN 111869500 to Ye, published Nov. 2020, foreign reference cited on Jan. 17, 2022 IDS. (Year: 2020).*
(Surna) How to Trellis Cannabis in the Pursuit of Better, Feb. 5, 2021 Yieldshttps://surna.com/blog/how-to-trellis-cannabis-in-the-pursuit-of-better-yields/.
Looking for Ideas for Trellis / THCFarmer—Cannabias Cultivation, Feb. 5, 2021 Networkhttps://www.thcfarmer.com/threads/looking-for-ideas-for-trellis.78895/.

* cited by examiner

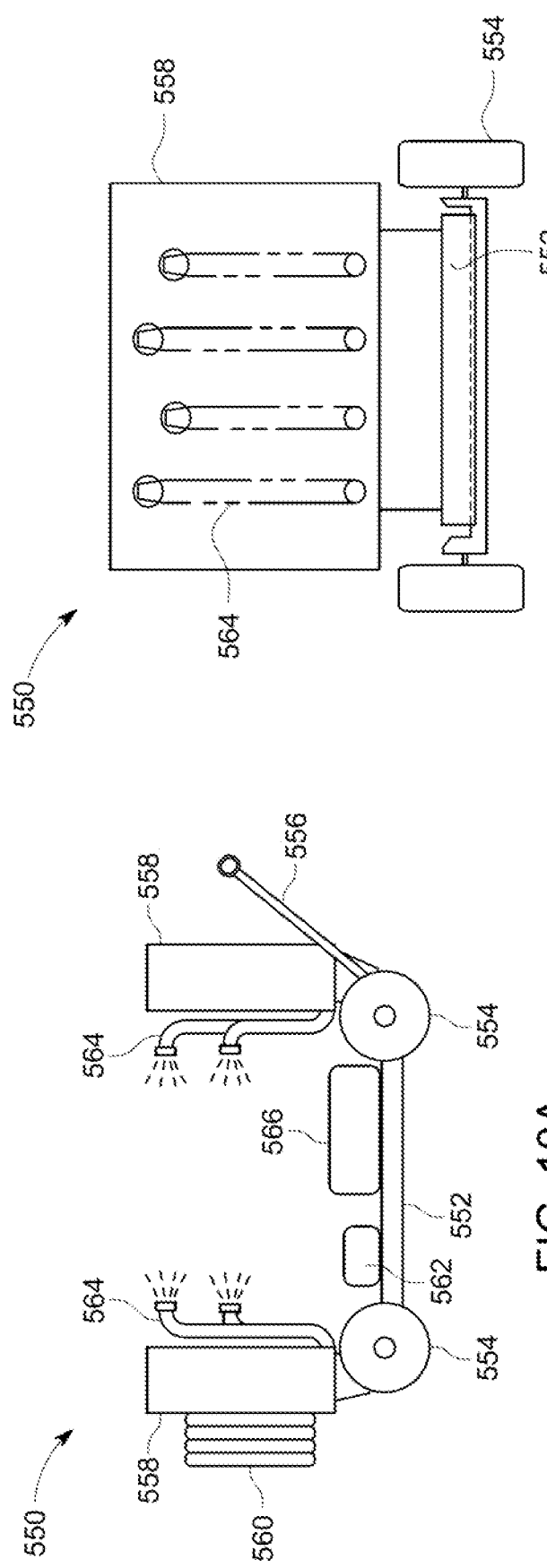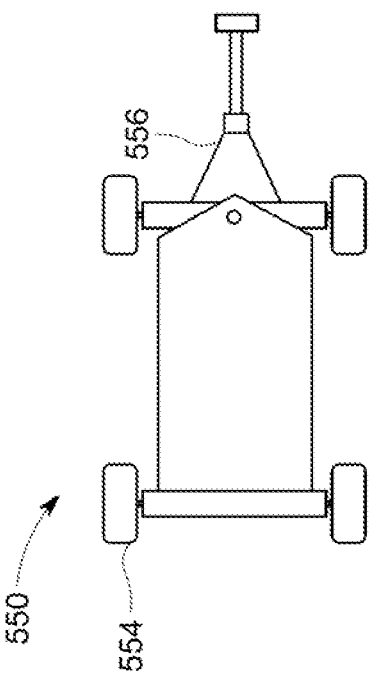
FIG. 10A
FIG. 10B
FIG. 10C

Detail A

Detail B

Detail C

Section D-D

TRAY AND TRELLIS SYSTEM FOR AN AUTOMATED FARM WITH ROBOTS WORKING ON PLANTS

CROSS-REFERENCE TO RELATED APPLICATIONS

The present application is a Continuation-in-Part of U.S. application Ser. No. 17/210,701 filed Mar. 24, 2021, which is a Continuation of International Application PCT/US2020/013342 filed Jan. 13, 2020, which claims benefit under 35 U.S.C. § 119(e) of U.S. Provisional No. 62/917,017, filed Nov. 14, 2018, the disclosures of which are expressly incorporated by reference herein in their entirety.

BACKGROUND

Field of Invention

Embodiments described herein generally relate to a Tray and Trellis System for an Automated Farm with Robots Working on Plants. The Automated Farm with Robots Working on Plants heavily automates indoor farming, especially the tasks of cloning, trimming or pruning, harvesting, inspecting, and maintaining cannabis and hemp plants. This is accomplished using robots with specialized attachments, conveyors, and dedicated rooms that are specifically arranged and controlled to facilitate various automated tasks and/or stages of development of the plants. The Tray and Trellis System provides a Trellis that is easily removed from growing plants without harming them, is easy to assembly, and is adaptable to various plants and growing conditions.

Related Art

As a result of years of research and development, consumers have become increasingly knowledgeable about the side effects of medications and food manufacturing processes. Consumers are therefore demanding medications, food, and other consumables that are more healthy and natural. Specifically regarding medications, currently cannabis and hemp is becoming more and more popular, which is resulting in growth and expansion of the cannabis and hemp industry. CBD oil may be used to treat or cure various ailments without the harsh side effects resulting from many other treatments. Cannabis and hemp farms all over the world are incorporating new technology and innovations to advance the production process to new levels. However, there is still a large opportunity for improvements to be made.

One of the major challenges cannabis and hemp farmers face is how delicate and unusual the cannabis or hemp plant is. Cannabis and hemp plants differ from most other plants in that they are harder to clone, trim, harvest, and maintain. To get the most out of cannabis and hemp plants, they have to be tended daily. In this respect cannabis and hemp plants are not like a field crop. They are more similar to a garden crop but even more demanding in that they must be tended frequently. Since these plants have such high upkeep, cannabis and hemp production is manual, redundant, and tedious work. At the same time, the hemp industry is rapidly growing, so that hemp farms are struggling to keep up with demand and paying excessive labor costs in order to maintain their crop.

Another challenge that many cannabis growers and processors face is the process of removing trellis netting from cannabis plants. Trellises are required for growing cannabis or hemp because, as the flowers develop, the top of the plant gets very heavy and tends to fall over and break. Trellises are commonly installed early in the growth cycle of the plant, and removed at harvest time. In between these times, the plant grows up through the trellis, so that in addition to providing support, the trellis becomes entrapped by the foliage. Once the plants have grown through the trellis and it is time for harvest, the netting is cut away and removed from the plant. Typical trellises in use today are made from unitized grids of string or plastic netting. Traditional trellises are very difficult for robots and other automation to work around, especially during harvest. Cutting the trellises away from the plants and removing them is difficult and time-consuming due to the dense foliage of cannabis plants. The string or plastic netting itself is non-reusable because of the fact that it has to be cut out in order to be removed from the plant.

Furthermore, the use of traditional trellises results in a lower quality product. Specifically, if string or plastic netting trellises are not removed very carefully, damage to the plants and loss of the trichomes containing the medicinal substances may occur. Trichomes are very small soft mushroom-shaped objects attached to the plant that are converted into crystals by way of a drying or curing process, whereupon they become more stable. At the time of harvest, the trichomes are sticky and fall easily from the plant, so that in the course of removing the string or plastic netting trellises, the trichomes may adhere to workers, their tools, and the trellis netting itself, as the workers touch and handle the plants, or may even be disturbed sufficiently to be released into the air. The plants themselves may further be harmed due to the movement and bending that results from removing the netting. There is also a greater risk of cutting or damaging the plant when attempting to cut the netting. Additionally, there is a risk that traditional trellis material itself may contaminate or be packaged with the product in shipment.

The cutting and removal of known trellises, therefore, presents the risk of reducing the quality of the final product, in addition to requiring extra time and labor. Accordingly, there is an unmet need for a Trellis System for an Automated Farm with Robots Working on Plants that is capable of meeting production demands, while meeting the specific requirements of cannabis or hemp plant husbandry.

SUMMARY

Embodiments described herein relate to a Tray and Trellis System for an Automated Farm with Robots Working on Plants. The Automated Farm with Robots Working on Plants itself comprises an automated indoor farm that includes specialized plant tending robots able to perform many of the cloning, trimming or pruning, harvesting, inspecting, maintaining, curing, and shipping tasks. Many of these tasks are accomplished using specialized tools attached to robots manufactured by FANUC America Corporation™, located at 3900 West Hamlin Rd., Rochester Hills, Mich. 48309. Additional engineered mechanisms contribute to the overall process. The specialized tools allow the robots to search the plants and find what they need in order to harvest, clone, trim, inspect, and maintain the plants. Conveyors and other devices are used to allow the entire farm to fully function under the supervision of a few people, rather than 30 or 40 employees normally required to operate a similarly sized farm.

The Automated Farm with Robots Working on Plants provides growing rooms for cannabis and hemp plants that are environmentally controlled, and specifically temperature, humidity, light, and air quality controlled for the needs of the plants at their various stages of cloning and development. Air exhausted from the growing rooms is filtered and treated in order to minimize any impact on the community in which the farm is located. The Automated Farm with Robots Working on Plants is physically arranged so that the cloning, inspecting, maintaining, trimming or pruning, and harvesting activities may be accomplished with minimal manual intervention. Each such activity is appointed a room and an arrangement of robots and other equipment that is efficiently dedicated to that task. The cannabis and hemp plants at various stages of development are moved as necessary between and within rooms using power roller conveyors, chain transfers, lift mechanisms, gravity skate wheel conveyors, transports, motorized racks, and specialized pots, trays, and sliding benches. Robots using specialized tools receive the cannabis or hemp plants in their specialized pots, trays, and/or sliding benches from the transport mechanisms, and are used to clone, trim or prune, harvest, inspect, and/or maintain the cannabis or hemp plants. Scrap material collection systems collect and dispose of scrap material. Other specialized robots and equipment perform transplanting and shipping tasks.

Small cubes of soil or Rockwool are used as a growing medium. They are handled and prepared by robots and other equipment, so that the robots having specialized tools for cloning, trimming, harvesting, and etcetera, are able to insert the clone plants into the prepared cubes of soil or Rockwool. Even the nursery that receives the newly cloned plants is heavily automated, with similar temperature, humidity, light, and air quality controls, and similar automated transport mechanisms, as the grow rooms. A farm control and data management system based on a control system network is used to coordinate the functions of the Automated Farm with Robots Working on Plants. Generally, the control system network operates all aspects of the farm automation including cloning, trimming or pruning, harvesting, inspecting, and maintaining the plants. The control system network is connected to cloning cells, planting cells, pruning or trimming cells, harvesting cells, and etcetera, by way of Industrial Programmable Logic Controllers, which it uses to control the robots, transport mechanisms, and environmental controls. The control system network may also log a large amount of data including atmospheric conditions and pictures of the plants.

With regards to the Tray and Trellis System for the Automated Farm with Robots Working on Plants, specialized pots, trays, and/or sliding benches may be provided with trellises and/or training arms in order support the top-heavy cannabis or hemp plants. The pots, trays, and/or sliding benches may include rotation holders that allow compatible rotating devices to rotate the cannabis or hemp plants in the pot, tray, and/or sliding bench. The Tray and Trellis System may be supported by a number of vertical posts or legs that may be free standing or may attach to a pot, tray, and/or sliding bench depending on a customer's grow setup. The Tray and Trellis System may be provided with longitudinal members and cross members that aid in rigidity. The longitudinal members and/or cross members may be embodied as bars, rods, tubes, angles, or other cross-section. The longitudinal members and/or cross members may be provided with tines to support the cannabis plants. In embodiments wherein both the longitudinal members and the cross members are provided with tines, the crossed tines create a trellis grid. The tines may be fashioned from any of several materials depending upon the desired durability, including for non-limiting example fiberglass, plastic, metal, and natural material such as bamboo, for non-limiting example. The tines may be of various thicknesses, depending upon the rigidity desired. The materials used may be easy to clean, and chemical and mold resistant.

The tines may be fixed to the longitudinal member or members on one side of the Tray and Trellis System, and may be releasably engaged to the longitudinal member or members on the other side of the Tray and Trellis System. Similarly, the tines may be fixed to one end cross member or intermediate cross member, and may be releasably engaged to another end cross member or intermediate cross member. At the fixed ends of the tines, the tines may be permanently fixed to the longitudinal members or cross members, as in by welding, bonding, or fastening. Alternately, the fixed ends of the tines may be fixed using clips or rings that connect to the tines, for non-limiting example by snapping onto the stem of the tines, by tapered fit, or by other press-fit type of engagement feature. In this way, if one of the clips breaks, it can be easily replaced.

In embodiments using clips or rings, the longitudinal members and/or cross members to which the ends of the tines are fixed using clips or rings may be provided with grooves, notches, protrusions, or dents, for non-limiting example at one inch increments. The clips or rings, then, may be provided with mating features that engage the grooves, notches, protrusions, or dents in the longitudinal members and/or cross members, thereby providing assistance in spacing the tines along the longitudinal members and/or cross members. The clips or rings may be provided with set screws, magnets, interference fit, or other means of limiting unintentional movement of the clips or rings along the longitudinal members and/or cross members. Still alternately, the tines and the longitudinal members or cross members at the fixed ends of the tines may be molded as a single piece.

At the releasably engaged ends of the tines, sometimes referred to herein as the tail ends of the tines, the ends of the tines may be incrementally constrained along the length of the opposite longitudinal members and/or cross members, for non-limiting example at one inch increments, or they may simply rest upon the opposite longitudinal members and/or cross members. If incrementally constrained along the length of the opposite longitudinal members and/or cross members, the incremental constraint may be by way of slots that hold the tines loosely along the tines' axis, but which slots only allow the tines to be engaged or disengaged vertically perpendicular to the tines' axis by snapping the tines into or out of the slots. Alternately, the incremental constraint may be by way of clips or rings, similar to the clips or rings of the fixed ends of the tines, each clip or ring having a feature such as a snap-fit slot feature that hold the tines loosely along the tines' axis, but which snap-fit slot features only allow the tines to be engaged or disengaged vertically perpendicular to the tines' axis by snapping the tines into or out of the snap-fit slot features. In at least one embodiment of the Tray and Trellis System, the clips or rings may be provided both with a snap-fit, tapered fit, or other press fit type of engagement feature, and with a feature such as a snap-fit slot feature that hold the tines loosely along the tines' axis, but which snap-fit slot features only allow the tines to be engaged or disengaged vertically perpendicular to the tines' axis by snapping the tines into or out of the snap-fit slot features.

In at least one embodiment of the Tray and Trellis System, the incremental constraints of the releasably engaged ends of the tines are embodied as grommets that describe incomplete circles, so that they are open in one laterally perpendicular direction. The open grommets are inserted into openings in the opposite longitudinal members and/or cross members, which openings have a narrow neck and wide recess, so that the open grommets are retained therein. The wide recess that holds the open grommet may be provided with a shape such as for non-limiting example an oval, an ellipse, a polygon, or a rectangular with semicircles at a pair of opposite sides, the shape minimizing rotation of the open grommet, so that the opening in the grommet remains aligned with the neck of the openings in the opposite longitudinal members and/or cross members.

Whether the releasably engaged ends of the tines are incrementally constrained by slots along the length of the opposite longitudinal members and/or cross members, clips or rings having slot features, or by open grommets inserted into openings in the opposite longitudinal members and/or cross members and having a narrow neck and wide recess, these features have in common that the releasably engaged ends of the tines may be engaged or disengaged vertically perpendicular to the tines' axis by snapping the tines into or out of the slots. In contrast, the releasably engaged ends of the tines may be disengaged longitudinally by simply grasping the longitudinal member or cross member at the fixed ends of the tines, and pulling the longitudinal member or cross member and tines horizontally in the direction of the fixed ends of the tines, thereby removing the longitudinal member or cross member and tines as a unit, or "comb," out of engagement with the incremental constraints. In this way, each comb may be removed from the trellis assembly without damaging the plants by simply sliding the comb out of the foliage of the plant.

The Tray and Trellis System for the Automated Farm with Robots Working on Plants is adaptable to many different sized pots, trays, sliding benches, and/or tables, and can be manufactured to different overall lengths and widths. By way of the exemplary one inch increments of the grooves, notches, protrusions, or dents in the longitudinal members and/or cross members at the fixed ends of the tines, and by way of the exemplary one inch increments of the incremental constraints at the releasably engaged ends of the tines, users of the Tray and Trellis System may pattern the resulting trellis grid in a multitude of patterns depending on preference and plant type. The grid pattern may be, therefore, as dense as one inch square grids, in the non-limiting example of embodiments using one inch increments, or may be larger or even rectangular.

The Tray and Trellis System is adjustable in height. This is accomplished using three way supports that hold the longitudinal members and cross members. The three way supports can slide up and down the vertical posts or legs, and may be fixed in place using a thumbscrew, tab, or other binding mechanism. The three way supports may be provided with features to securely retain the longitudinal members and cross members therein, while providing lateral stability in order to support the tines attached to the longitudinal members and cross members.

According to one embodiment of the invention, an automated farm has a Tray and Trellis System. The Tray and Trellis System includes vertical posts or legs, longitudinal members, and cross members. Combs including multiple tines are fixed at one end to longitudinal members on one side of the Tray and Trellis System. The multiple tines are releasably engaged at their other end to other longitudinal members on the other side of the Tray and Trellis System. Further combs include multiple additional tines fixed at one end to a cross member at one end of the Tray and Trellis System. The multiple additional tines are releasably engaged at their other end to another cross member at the other end of the Tray and Trellis System. There may be intermediate cross members having multiple additional tines fixed to them and having multiple additional tines releasably engaged to them.

According to another embodiment of the invention, a Tray and Trellis System of an automated farm includes vertical posts or legs, longitudinal members, and cross members. Combs including multiple tines are fixed at one end to longitudinal members on one side of the Tray and Trellis System. The multiple tines are releasably engaged at their other end to other longitudinal members on the other side of the Tray and Trellis System. Further combs include multiple additional tines fixed at one end to a cross member at one end of the Tray and Trellis System. The multiple additional tines are releasably engaged at their other end to another cross member at the other end of the Tray and Trellis System. There may be intermediate cross members having multiple additional tines fixed to them and having multiple additional tines releasably engaged to them.

The Tray and Trellis System for the Automated Farm with Robots Working on Plants is easily manufactured, easily assembled and disassembled, easily repairable, can be reused multiple times, can be removed quickly and easily, and results in a better grade of product as it allow workers or machines to remove combs by sliding them out of the foliage without reaching into the plants. As a result, harvesting the plants is easier, takes less time, and results in less loss of trichomes. The combs can be stored in a given state of adjustment, saving time from year to year. The Tray and Trellis System is vertically adjustable, allowing it to accommodate plant growth. Further, the Tray and Trellis System is adaptable to different strains of plants. Specifically, the trellis can be customized to be more rigid for larger plants, or can be made with lighter material to save on cost for use with strains that may be smaller or less bulky. The rigidity of the design of the Tray and Trellis System is beneficial for growing large and/or heavy plants. The materials used may be selected by the user depending upon desired quality and price, along with whether or not the trellises are of fixed size or adjustable.

The Tray and Trellis System when disassembled occupies little space so that it is easily stored and shipped. It can be manufactured and shipped in a knock-down state, so that the final user may easily assemble it. By virtue of the sliding disengagement of the combs from the plant foliage enabled by the releasably engaged ends of the tines being constrained by slots, clips or rings having slot features, or by open grommets, harvest is improved as workers are not required to reach into the foliage to remove the trellis. As a result, less medicinal trichomes are lost. Additionally, the Tray and Trellis System is more compatible with automation, for non-limiting example, use of an actuator or robot to manipulate the combs and remove them from the plants. Therefore, the Tray and Trellis System eliminates waste, saves money, time, and labor, and results in the production of a higher quality final product.

DESCRIPTION OF THE DRAWINGS

The above-mentioned and other features of embodiments of the Tray and Trellis System for an Automated Farm with Robots Working on Plants, and the manner of their working, will become more apparent and will be better understood by reference to the following description of embodiments of the Tray and Trellis System for an Automated Farm with Robots Working on Plants taken in conjunction with the accompanying drawings, wherein:

FIG. 10A is a side view of a portable spray station of an embodiment of an Automated Farm with Robots Working on Plants, as described herein;

FIG. 10B is an end view of a portable spray station of an embodiment of an Automated Farm with Robots Working on Plants, as described herein;

FIG. 10C is a bottom view of a portable spray station of an embodiment of an Automated Farm with Robots Working on Plants, as described herein;

Corresponding reference numbers indicate corresponding parts throughout the several views. The exemplifications set out herein illustrate embodiments of the Tray and Trellis System for an Automated Farm with Robots Working on Plants, and such exemplifications are not to be construed as limiting the scope of the claims in any manner.

DETAILED DESCRIPTION

Figure 1:
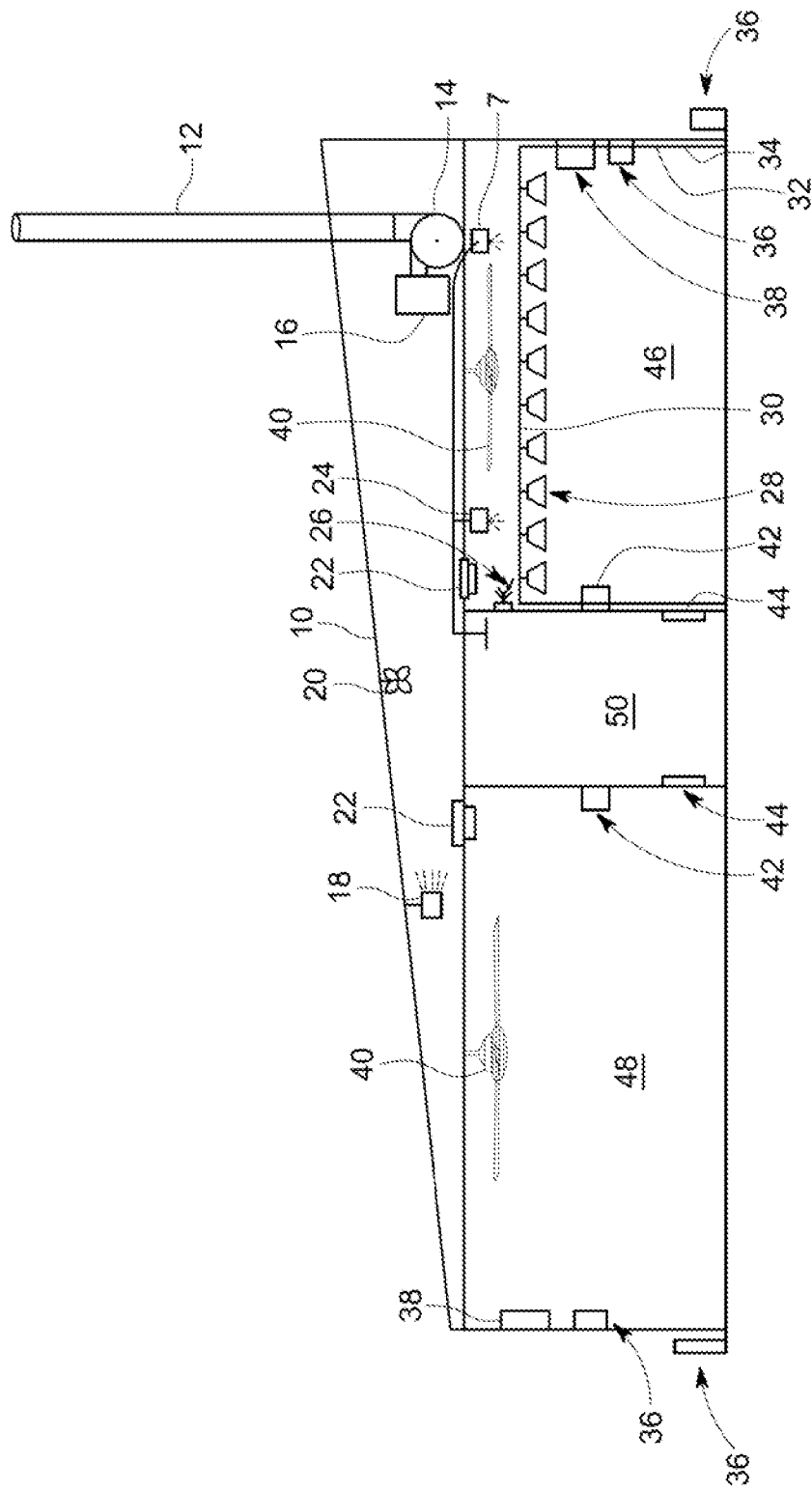
FIG. 1 is a sectional end view of an embodiment of an Automated Farm with Robots Working on Plants, as described herein.

Referring now to FIG. 1, a sectional end view of an embodiment of an Automated Farm with Robots Working on Plants is shown. The farm building is a building with environmentally controlled grow rooms. A single slope roof 10 uses the attic to collect and treat the air that comes out of the grow rooms 46 and 48. Grow room 46 is a flower room with lights 46, and grow room 48 is a flower room without lights 48. In both grow rooms 46 and 48, split HVAC systems 36 have outdoor condensers and indoor heat pumps. Large ceiling fans 40 circulate air throughout the grow rooms 46 and 48, as well as replicate wind which strengthens the plants. Humidifiers and/or dehumidifiers 42 keep the humidity in range if it becomes too low or too high. Room air filters 44 perform a final filtration of the air that gets pulled into the grow rooms 46 and 48 from a preconditioned air hallway 50. The preconditioned air hallway 50 has four air intakes (not shown) from the outside. The four intakes are equipped with heaters, humidification, and filtration controls (not shown). Sensors 38 measure the temperature, humidity, and wind speed in each of the grow rooms 46 and 48. This system is in every grow room as well as in the parent room, to be discussed in further detail herein. The sensors 38 are read incrementally every few seconds and the results are recorded in a database. This gives each plant a history of the atmosphere in which they spent their whole life.

In the flower room with lights 46, there is a CO2 nozzle 24 that enriches and/or fertilizes the cannabis or hemp plants by saturating the flower room with lights 46 with CO2. There is also a spray nozzle 26, which has a dual effect of cooling the flower room with lights 46 and increasing the humidity thereof. Grow lights 28 are arranged in a grid above the plants in the flower room with lights 46. The grow lights 28 are arranged on an automated light rack 30, which is provided with four automated light rack posts 32 located in the corners of the flower room with lights 46. The four automated light rack posts 32 are each equipped with an integrated screw jack 34 that adjusts the automated light rack 30 up and down. In this way, the grow lights 28 may be adjusted in height, in order to avoid burning and damaging the cannabis or hemp plants due to the grow lights 28 being too close to the plants. Additionally, when the grow lights 28 are turned on, they may be turned all the way up and then lowered after several minutes. This more closely replicates the sun when it comes up in the morning. As a result, the plants wake up faster and consume nutrients better which produces more growth.

Each of the grow rooms 46 and 48 is provided with a grow room exhaust fan 22 that exhausts air from the grow rooms 46 and 48 to the attic. Replacement air is thereby pulled into the grow rooms 46 and 48 by way of the room air filters 44 located between the grow rooms 46 and 48 and the preconditioned air hallway 50. Air from the grow rooms 46 and 48 has a pungent odor that needs to be treated prior to exhausting to the outside. The air is therefore filtered by an activated charcoal filter 16 at the intake of an exhaust blower 14, before being exhausted through an exhaust stack 12. In the attic there may be one or more o-zone generators 18, as well as one or more attic circulation fans 20.

Figure 2:
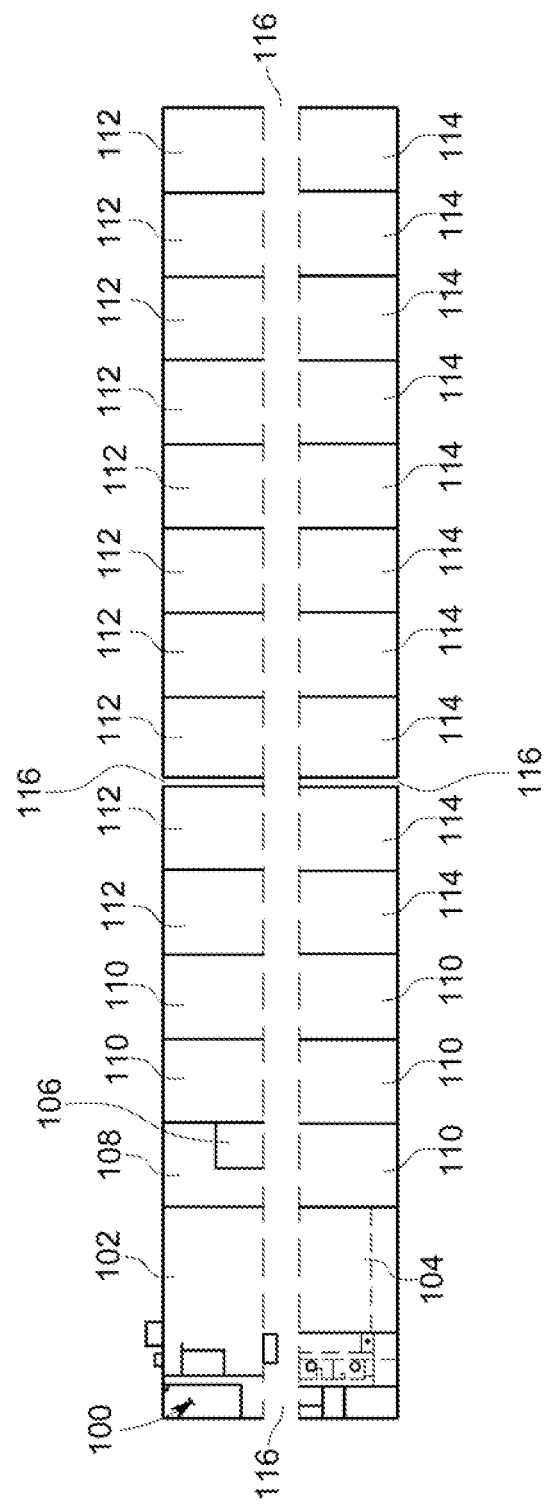
FIG. 2 is a floor plan of an embodiment of an Automated Farm with Robots Working on Plants, as described herein.

Turning now to FIG. 2, a floor plan of an embodiment of an Automated Farm with Robots Working on Plants is shown. In the embodiment shown, the building is 656 feet long and 120 feet wide, as a non-limiting example. There is a sixteen foot wide main corridor hallway that runs down the middle along the whole length of the building. An equipment and tank room 100 is provided at one end of the building, although it is contemplated that the equipment and tank room 100 may be otherwise located. A clone and parent room 102 and a harvest room 104 are further provided at one end of the building, although it is contemplated that the clone and parent room 102 and/or the harvest room 104 may be otherwise located. The clone and parent room 102 will be described in greater detail hereinafter, and particularly in FIGS. 3 and 9. The harvest room 104 is equipped with equipment needed for harvest, which will similarly be described in greater detail hereinafter, and particularly in FIG. 11. A trimming or pruning room 106 is also provided near the clone and parent room 102 and harvest room 104, although it is contemplated that the trim and pruning room 106 may be otherwise located. The trim and pruning room 106 will be described in greater detail hereinafter. A laboratory 108 may adjoin the trim and pruning room 106, and may contain, for non-limiting example, extraction equipment, and other equipment to make rolled cannabis cigarettes, as well as the equipment to package them.

Next, there are provided, for non-limiting example, five vegetation grow rooms 110 that are similar to flower rooms 112 and 114 except some of the flower rooms have lights, as will be explained herein. The vegetation grow rooms 110 may be located adjacent to the clone and parent room 102, harvest room 104, and/or trim and pruning room 106, although it is contemplated that the vegetation grow rooms 110 may be otherwise located. Each vegetation grow room 110 has trays with, for non-limiting example, sixty plants per tray, although it is contemplated that more or less plants per tray may be used. All of the rest of the grow rooms throughout the farm may have, for non-limiting example, ten plants per tray, although it is contemplated that more or less plants per tray may be used. There are a total of, for non-limiting example, twenty flower rooms 112 and 114. Ten of them are flower rooms with lights 112, and ten of them are flower rooms without lights 114. The flower rooms without lights 114 are directly across from the flower rooms with lights 112. A flowering operation gives the plants twelve hours of light per day. In order to facilitate this, the plants travel back and forth between the flower rooms with lights 112 and the flower rooms without lights 114 every twelve hours. Air intakes 116 are located above overhead doors at the main entrances at each end of the building. The air intakes 116 as described earlier prepare the air that enters the hallway with heat, humidity, and etcetera.

Figure 3:
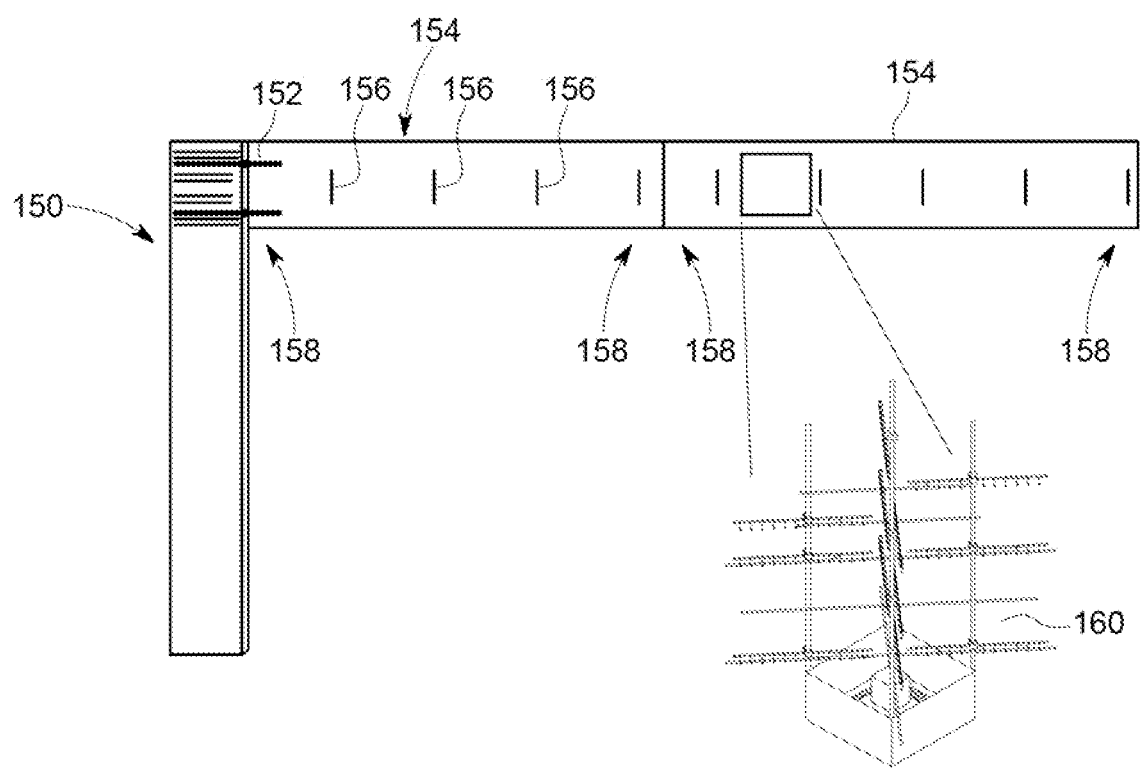
FIG. 3 is a plan view of a parent conveyor of an embodiment of an Automated Farm with Robots Working on Plants, as described herein.

FIG. 3 shows a plan view of a parent power roller conveyor 150 of an embodiment of an Automated Farm with Robots Working on Plants. The parent power roller conveyor 150 is a combination of a powered roller conveyor and a gravity skate wheel conveyor. The parent power roller conveyor 150 brings the parent plants which are grown in a unique parent plant pot 160. The purpose of the parent power roller conveyor 150 is to have a place for the parent plants to live, grow, and be transported to get inspected and fed. The parent power roller conveyor 150 also takes the parent plants to a robot cell for cloning, i.e.—to give up their starts. A chain transfer 152 lifts, turns, and transfers the parent plant pot 160 off the parent power roller conveyor 150 and onto a gravity skate wheel conveyor 154. Palette stops 156 are located along the gravity skate wheel conveyor 154. The palette stops 156 pneumatically raise and lower skate wheels, which stops and positions the parent plant pots 160. The gravity skate wheel conveyor 154 may be provided with a lift mechanism 158. For non-limiting example, there may be a lift mechanism 158 at the end of each ten foot section of gravity skate wheel conveyor 154.

As an example, when a parent plant pot 160 is being transferred into position, it will self-locate along the parent power roller conveyor 150. The chain transfer 152 will lift up, turn, and move the parent plant pot 160 onto the gravity skate wheel conveyor 154. Then the chain transfer 152 will lower, placing the parent plant pot 160 onto the gravity skate wheel conveyor 154. The lift mechanism 158 lifts the gravity skate wheel conveyor 154 under the parent plant pot 160. Gravity rolls the parent plant pot 160 downhill against the first palette stop 156, and then the palette stop 156 lowers so the parent plant pot 160 can move on to the next palette stop 156, and so on. Proximity sensors read the position of the parent plant pot 160, the chain transfer 152 moves up and down, and the palette stops 156 raise and lower as required to place the parent plant pot 160 where desired.

Figure 4A:
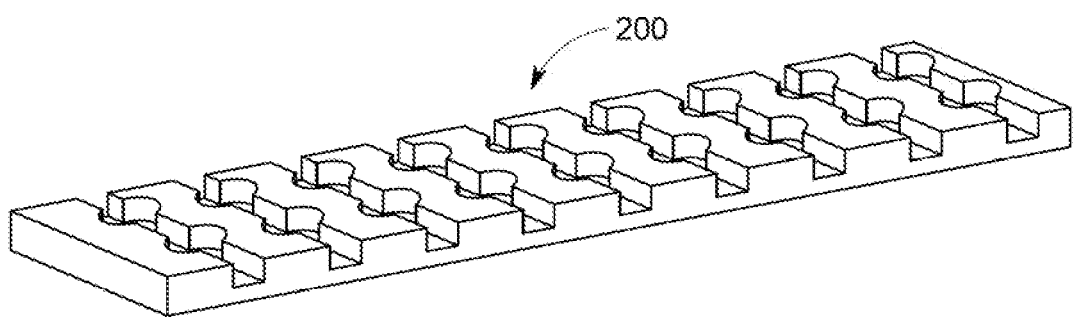
FIG. 4A is an isometric view of a child conveyor of an embodiment of an Automated Farm with Robots Working on Plants, as described herein.
Figure 4B:
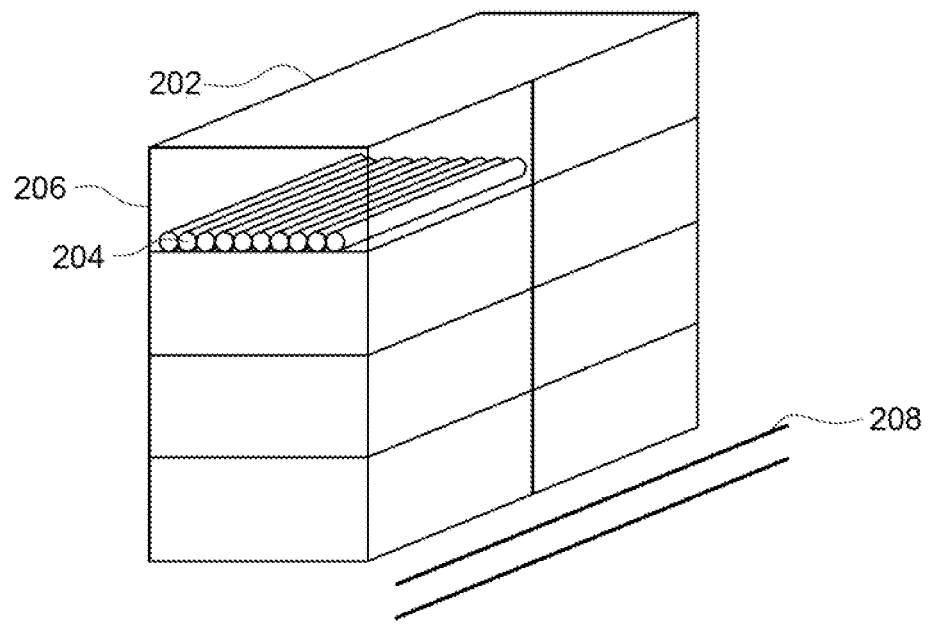
FIG. 4B is an isometric view of a storage rack of an embodiment of an Automated Farm with Robots Working on Plants, as described herein.
Figure 4C:
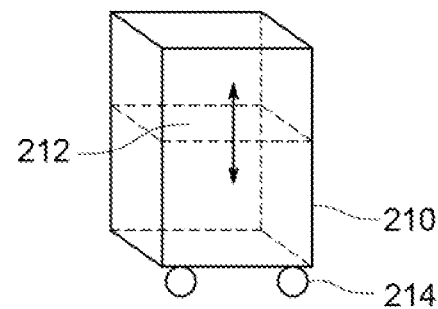
FIG. 4C is an end view of a storage and retrieval system of an embodiment of an Automated Farm with Robots Working on Plants, as described herein.

Turning now to FIGS. 4A, 4B, and 4C, an isometric view of a child conveyor tray 200 of a child conveyor of an embodiment of an Automated Farm with Robots Working on Plants is shown. The child conveyor transports such trays of young plants into child storage racks 202 where they grow and are subject to processes such as watering, inspecting, transplanting, and packaging. The child plants are planted in a small cube of soil or Rockwool. The child conveyor tray 200 may have, for non-limiting example, two rows of five holes or cavities for the child plants, so that it is capable of holding ten plants. However, it is contemplated that more or less holes or cavities may be provided, as shown in FIG. 4A. Transverse slots allow room for robot grippers to operate. The child conveyor trays 200 are loaded by clone robots and are transported into a nursery. More details on the operation of such clone robots will be discussed hereinafter, and particularly in FIG. 9. The nursery has multiple child storage racks 202, each of which contain a gravity conveyor 204 and a lifting mechanism 206.

A storage and retrieval system 210 is provided with a track 208, so that the motorized child storage racks 202 are able to traverse the track 208 using powered wheels or powered actuators 214 to their intended destination. Each child storage rack 202 is further provided with at least one movable shelf 212 that raises up-and-down, as well as features that convey the child conveyor trays 200. The at least one movable shelf 212 receives child plants from the gravity conveyor 204 and transfers them to the child storage rack 202 and back as required. The powered wheels 214 and drivetrain of the child storage rack 202 of the storage and retrieval system 210 are used to keep it in position for loading and unloading. The child conveyor control system (not shown) is an industrial Programmable Logic Controller (PLC). The movable shelf 212 and the powered wheels 214 are powered by servomotors (not shown).

Figure 5B:
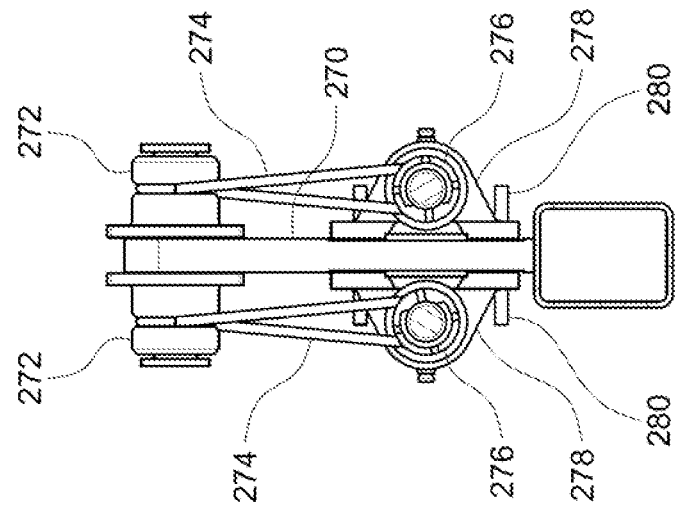
FIG. 5B is an end view of a two groove roller of an embodiment of an Automated Farm with Robots Working on Plants, as described herein.
Figure 5A:
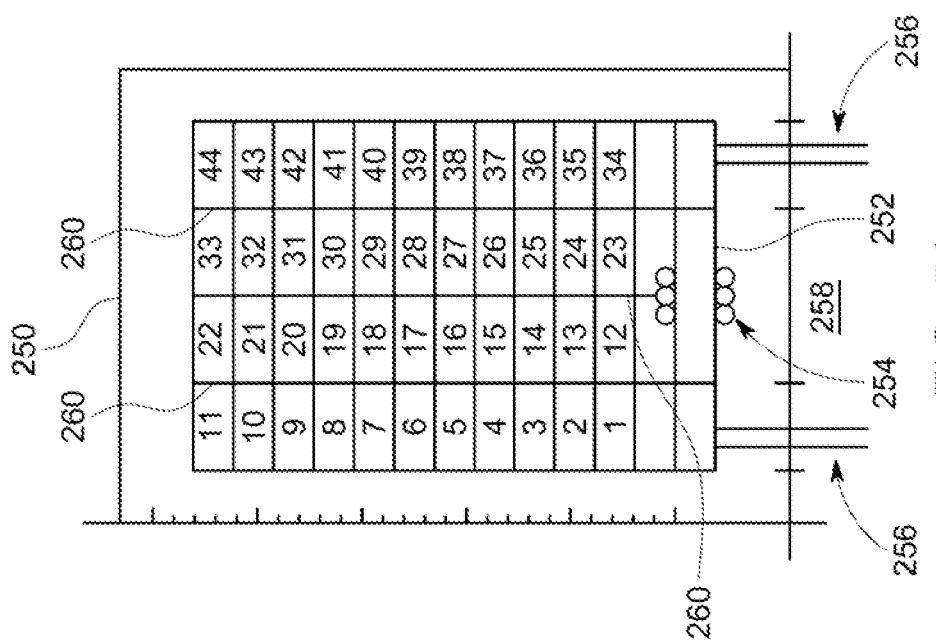
FIG. 5A is floor plan of a conveyor room of an embodiment of an Automated Farm with Robots Working on Plants, as described herein.

FIG. 5A shows a typical grow room 250 with its conveyor layout. Each grow room 250 may contain 44 trays with ten plants on each tray. Tray sizes, for non-limiting example, may be 40" by 100". In the front of the grow room 250, close to the hallway 258, is a section of a conveyor plant testing and watering section 252 that is used for testing the plants and watering them. An automated testing station 254 pneumatically, or using an actuator, inserts probes into the plants' soil to test the moisture, temperature, and electrical current. Electrical current is used to measure the amount of salts left in the soil from the fertilizers. Conveyors 256 extend out into the hallway 258. These conveyors 256 move the trays in and out of the grow room 250. A cross transfer 260 lifts each tray up, and then moves it to the adjacent row. For example, the tray at position 11 is lifted up, whereupon motorized rollers transfer the tray to position 22. Recall from FIG. 2 that there are three types of grow rooms, which in the embodiment of the Automated Farm with Robots Working on Plants shown in FIG. 2 include five vegetation grow rooms, ten flower rooms with lights, and ten flower rooms without lights. The conveyors 256 may be the same for all grow rooms.

Figure 5C:
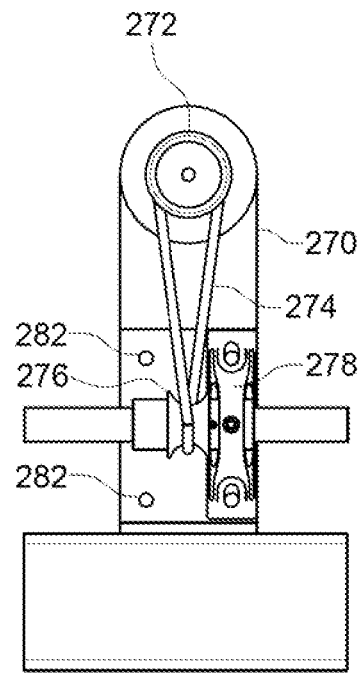
FIG. 5C is a side view of a two groove roller of an embodiment of an Automated Farm with Robots Working on Plants, as described herein.
Figure 5D:
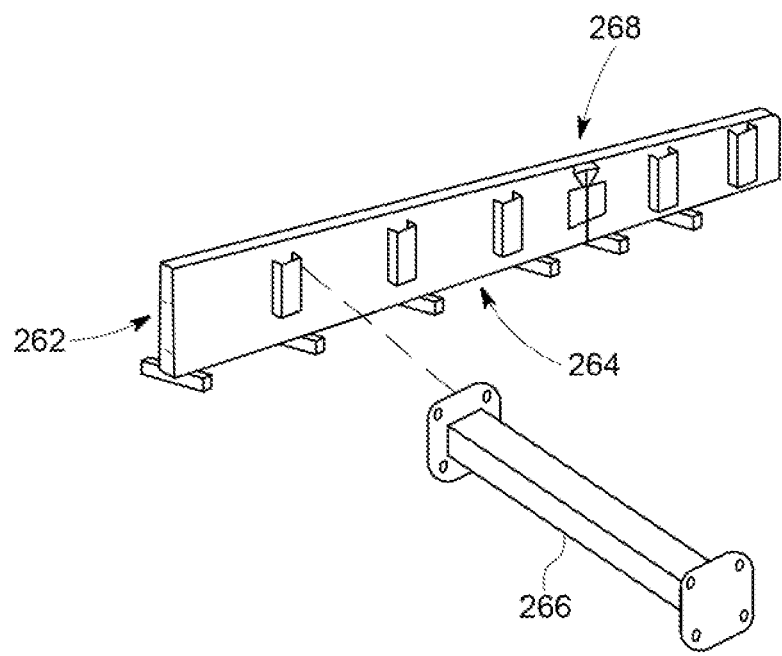
FIG. 5D is an isometric view of a conveyor of an embodiment of an Automated Farm with Robots Working on Plants, as described herein.
Figure 6A:
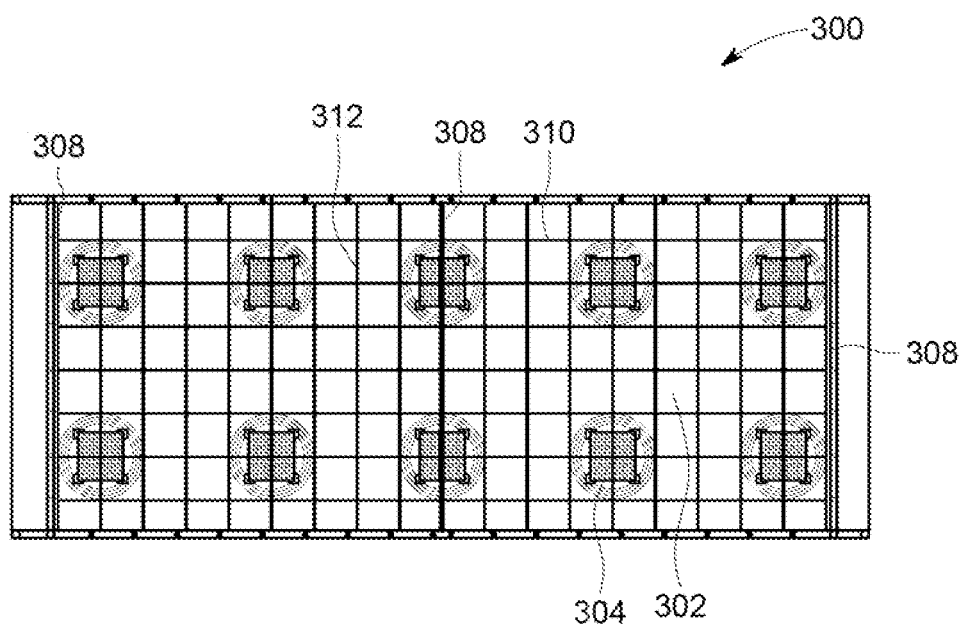
FIG. 6A is a top view of a tray and trellis of an embodiment of an Automated Farm with Robots Working on Plants, as described herein.
Figure 6B:
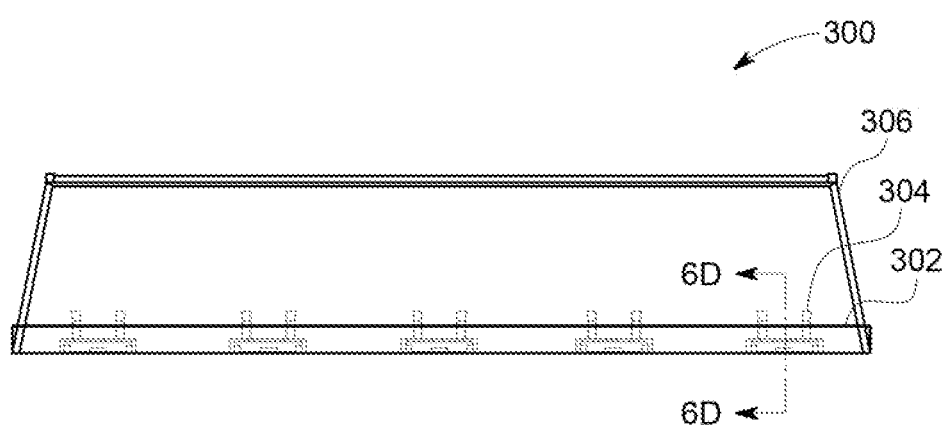
FIG. 6B is a side view of a tray and trellis of an embodiment of an Automated Farm with Robots Working on Plants, as described herein.
Figure 6C:
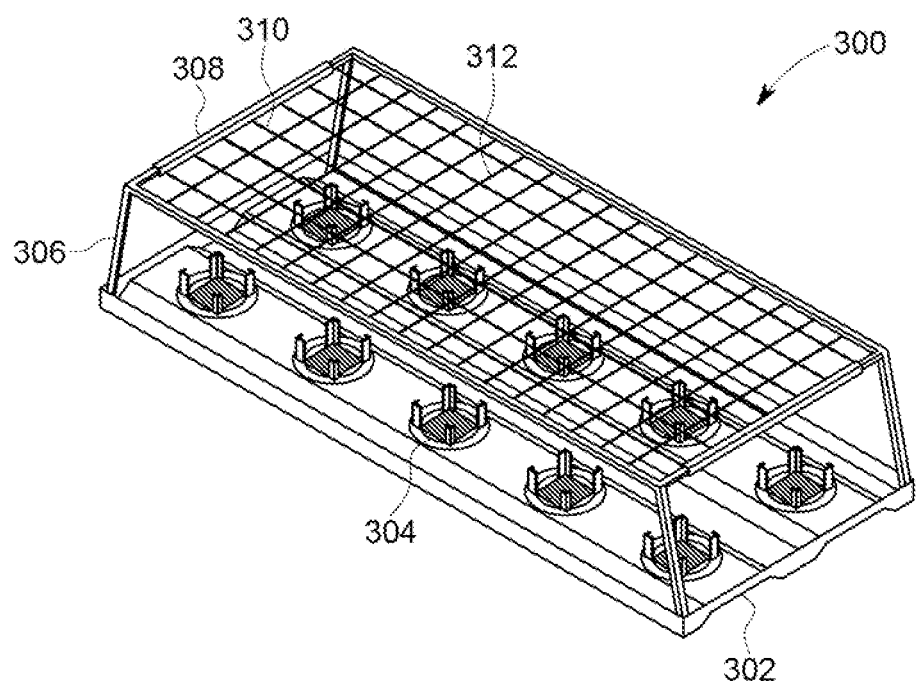
FIG. 6C is an isometric view of a tray and trellis of an embodiment of an Automated Farm with Robots Working on Plants, as described herein.
Figure 6D:
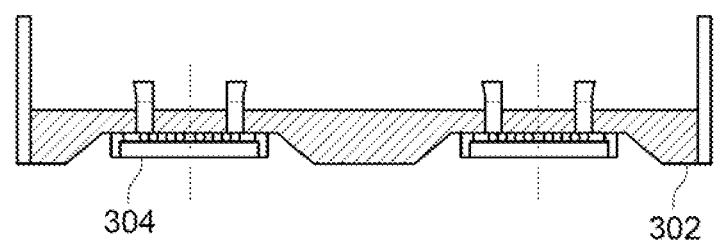
FIG. 6D is a section view of a tray of an embodiment of an Automated Farm with Robots Working on Plants, as described herein.

FIG. 5D shows a conveyor frame 262, of which there are five in the each of the grow rooms 250. The conveyor frames 262 are assembled using splice-on gussets and fish plates 268. The conveyor frames 262 are fixed in location from each other using offset splice tubes 264 and bolt-on spacer bars 266. The conveyor frames 262 are similar in each instance, except that the outside two conveyor frames 262 only have a single set of rollers and the inside three conveyor frames 262 have two rows of driven rollers. The conveyor frames 262 themselves are the same for both the single roller and double roller sections.

FIGS. 5B and 5C show an embodiment of a roller bracket 270 used in conjunction with the conveyor frames 262, which are in turn part of the conveyor layout of a child conveyor of an embodiment of an Automated Farm with Robots Working on Plants. The roller bracket 270 is of fixed construction, except that it may be provided in two heights, one being for driving the narrow side of the child conveyor trays, and a two inch taller version for driving the wide side of the child conveyor trays. The roller bracket 270 performs the function of holding the axle of two groove rollers 272, which are used to propel the trays. The two groove rollers 272, which may be constructed from plastic, for non-limiting example, are each provided with grooves to receive drive belts 274. The drive belts 274 are, in turn, driven by drive rollers 276. The drive rollers 276 are driven by a motor driven driveshaft, which runs in bearings with two-hole straps 278. Bearings with two hole straps 278 of this type may be sourced from McMaster Carr, located at 1901 Riverside Pkwy., Douglasville, Ga. 30135-3150, where they are sold as part number 5913K64. Set screws 280 are provided in tapped holes 282 for the purpose of fastening bearings with two-hole straps 278. The control device for the plant conveyors may be an industrial PLC (not shown). Proximity sensors (not shown) track the trays and the movement of the mechanisms. Pneumatics and motors may be used for power.

Turning now to FIGS. 6A, 6B, 6C, and 6D, a top view, side view, isometric view, and section view, respectively, of a tray and trellis system 300 of a non-limiting exemplary embodiment of an Automated Farm with Robots Working on Plants is shown. The tray and trellis system 300 includes a tray 302 that holds ten plants, and a trellis frame 306. The tray and trellis system 300 is designed specifically to accommodate automation and has certain unique features for this purpose. The tray 302 uses six inch cubed Rockwool, also known as mineral wool, mineral fiber, or mineral cotton, to grow the plants in, although it is contemplated that other growing media may be used. The Rockwool cubes are placed in rotation holders 304. Each rotation holder 304 is a molded plastic unit that snaps into the tray 302, which may be formed from metal, plastic, or other material. Additional rotating devices (not shown) employed by the Automated Farm with Robots Working on Plants at various points throughout the cloning, trimming or pruning, harvesting, inspecting, and maintaining process have the ability to slightly lift the rotation holder 304 within the tray 302 and rotate the plant which exposes all sides of the plant to robots and cameras as needed.

The tray 302 may be designed to give each plant a 20 inch by 20 inch area to live in, for non-limiting example. The tray 302 may therefore be 100 inches long and 40 inches wide. A trellis frame 306 is connected to the tray 302. The trellis frame 306 of the present disclosure supports, for non-limiting example, four trellis combs 308, although it is contemplated that more or less trellis combs 308 may be used. Each of the trellis combs 308 has a trellis comb spine 310 and multiple trellis comb ribs 312 attached to the trellis comb spine 310 that are equally spaced apart to create a grid of the desired size. The trellis comb spine 310 and the trellis combs 308 are positioned approximately perpendicular to each other to form a grid. This design allows automated devices to pull the trellis combs 308 out horizontally, thereby releasing the plants for harvest.

Turning now to FIGS. 7A, 7B, 7C, and 7D, a top view, a side view, an isometric view, and a detail view, respectively, of two robots 358 and 360 of an embodiment of an Automated Farm with Robots Working on Plants are shown. The two robots 358 and 360 are shown working on a cannabis or hemp plant 354 in a room 356. One robot 358 has a lighted tablet or backlight tool 350 that can be inserted into the cannabis or hemp plant 354 to facilitate manipulating its branches, leaves, and flowers. A second robot 360 has a grip-cut tool 352 for cutting and gripping the branches, leaves, and flowers of the cannabis or hemp plant 354, and is further provided with a vision system camera (not shown). The vision system camera may be attached to the grip-cut tool 352, or may be attached elsewhere to the grip-cut tool holding robot 360.

The grip-cut tool holding robot 360 generally maintains a position perpendicular and centered to the backlight tablet tool 350 held by the backlight tablet tool holding robot 358. The backlight tablet tool holding robot 358 systematically moves the backlight tablet tool 350 through the plant while the camera of the grip-cut tool holding robot 360 looks for an ideal cloning, trimming or pruning, harvesting, and/or maintaining situation. When the ideal cloning, trimming or pruning, harvesting, and/or maintaining situation presents itself to the vision system, the backlight tablet tool holding robot 358 stops and the grip-cut tool holding robot 360 moves in a perpendicular motion to the backlight tablet tool 350, towards the plant. The grip-cut tool holding robot 360 grips the cannabis or hemp plant 354 and cuts the branch, leaf, or flower to be removed.

Figure 7A:
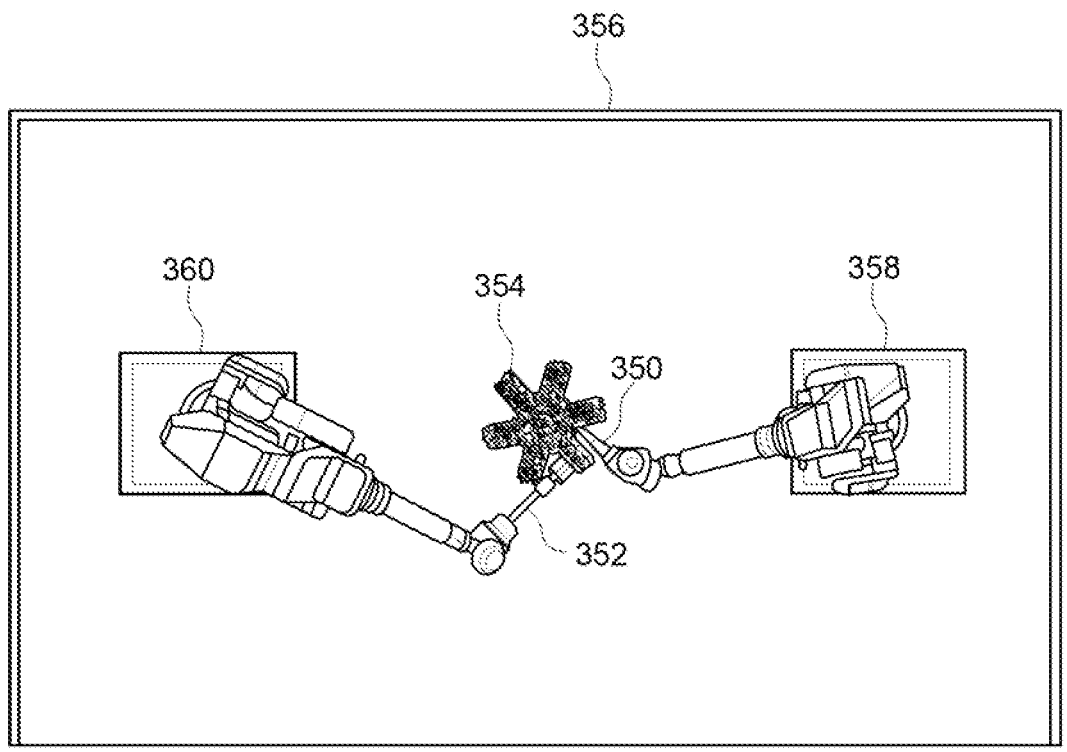
FIG. 7A is a top view of two robots of an embodiment of an Automated Farm with Robots Working on Plants, as described herein.
Figure 7B:
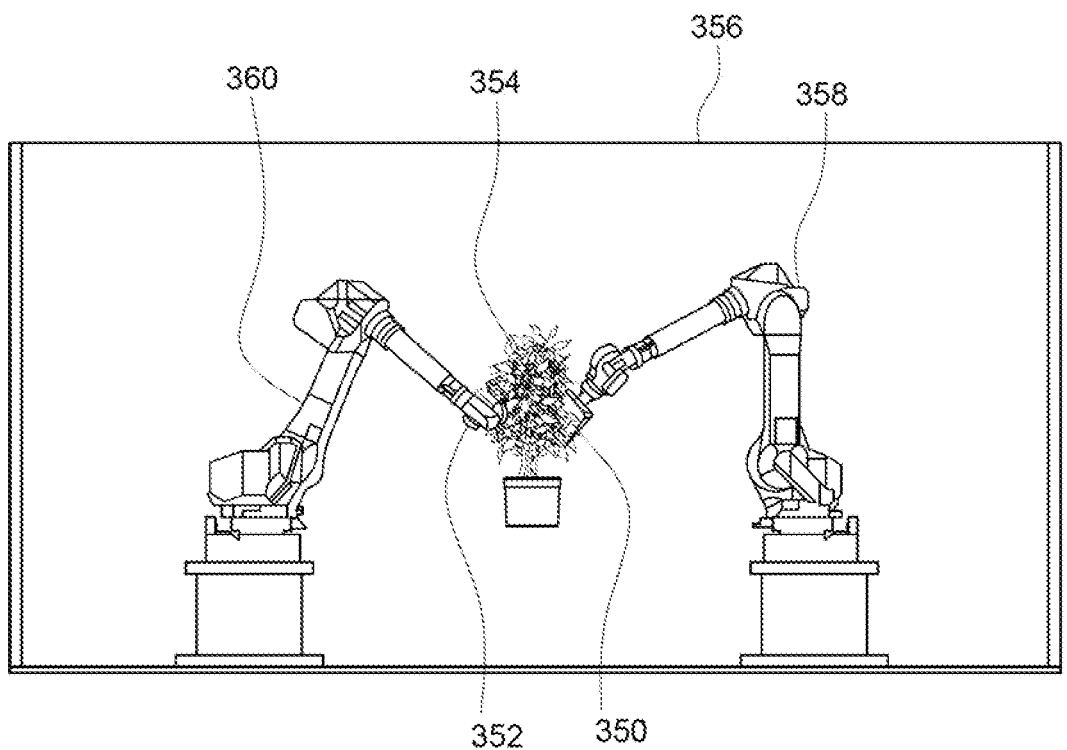
FIG. 7B is a side view of two robots of an embodiment of an Automated Farm with Robots Working on Plants, as described herein.
Figure 7C:
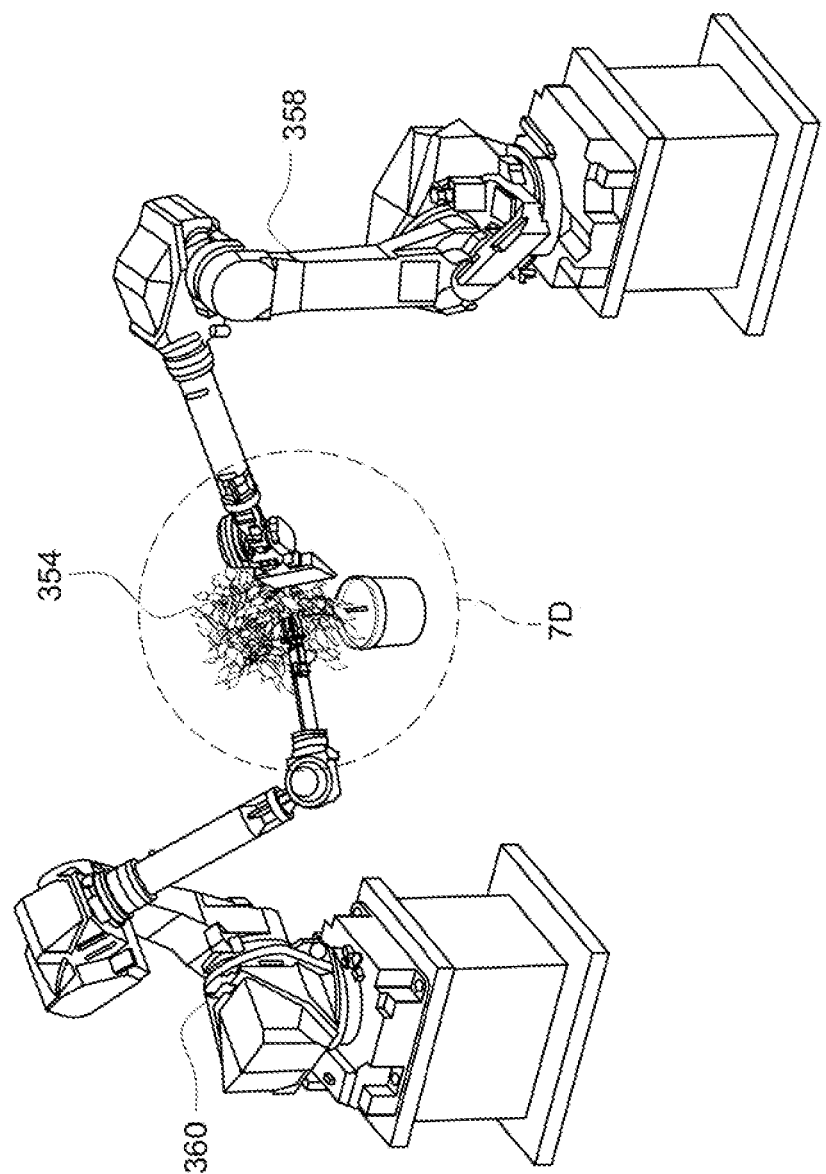
FIG. 7C is an isometric view of two robots of an embodiment of an Automated Farm with Robots Working on Plants, as described herein.
Figure 7D:
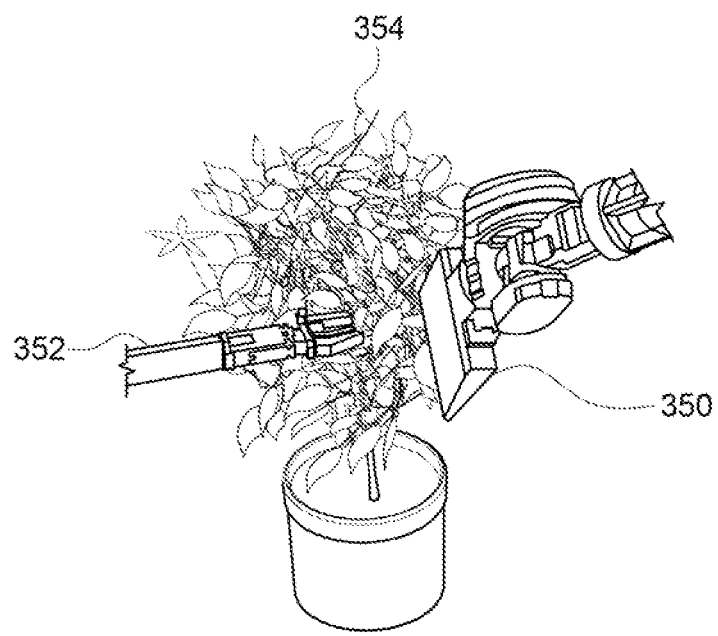
FIG. 7D is a detail view of two robots of an embodiment of an Automated Farm with Robots Working on Plants, as described herein.
Figure 7E:
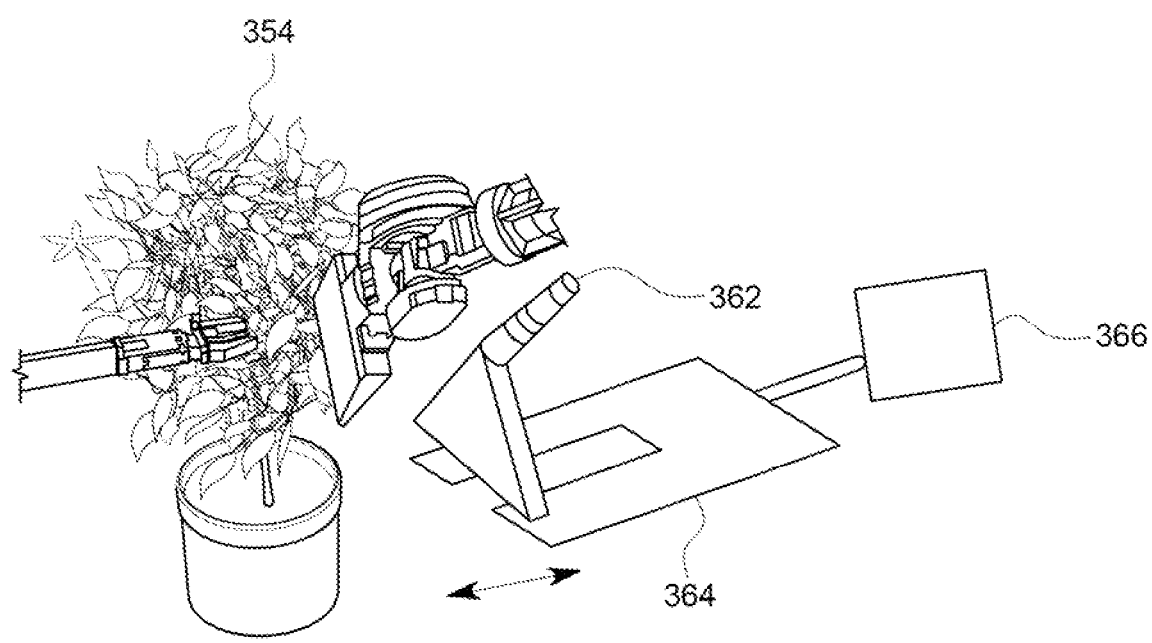
FIG. 7E is a detail view of scrap removal by two robots of an embodiment of an Automated Farm with Robots Working on Plants, as described herein.

FIG. 7E further shows a trim recovery system 362, which is used to collect scrap material generated as the backlight tablet tool holding robot 358 and the grip-cut tool holding robot 360 perform their cloning, trimming or pruning, harvesting, and/or maintaining functions. The trim recovery system 362 vacuums up materials that have been cut from the cannabis or hemp plant 354. In at least one embodiment, this is accomplished by extending a catch tray 364 while the backlight tablet tool holding robot 358 and the grip-cut tool holding robot 360 are performing their tasks. When the backlight tablet tool holding robot 358 and the grip-cut tool holding robot 360 have completed trimming or pruning, a catch tray actuator 366 retracts the catch tray 364. As the catch tray 364 retracts a vacuum (not shown) sweeps up all of the debris that is left on the catch tray 364.

Figure 8A:
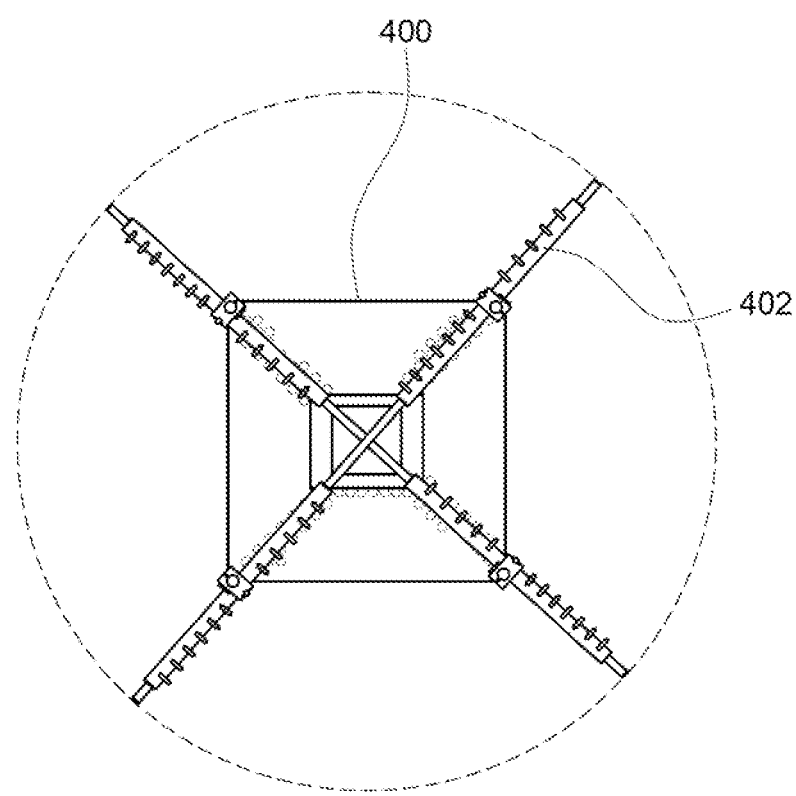
FIG. 8A is a top view of a pot and training tools assembly of an embodiment of an Automated Farm with Robots Working on Plants, as described herein.
Figure 8B:
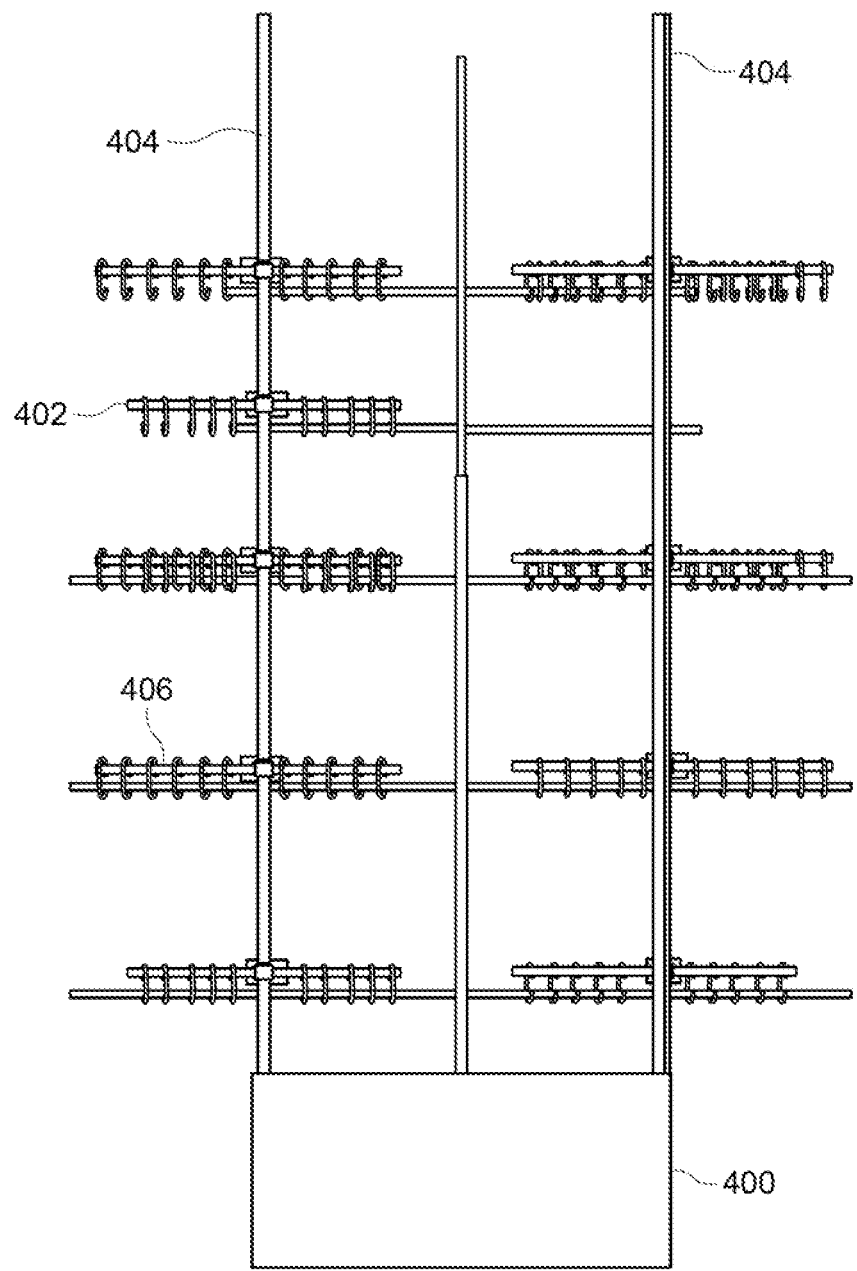
FIG. 8B is a side view of a pot and training tools assembly of an embodiment of an Automated Farm with Robots Working on Plants, as described herein.
Figure 8C:
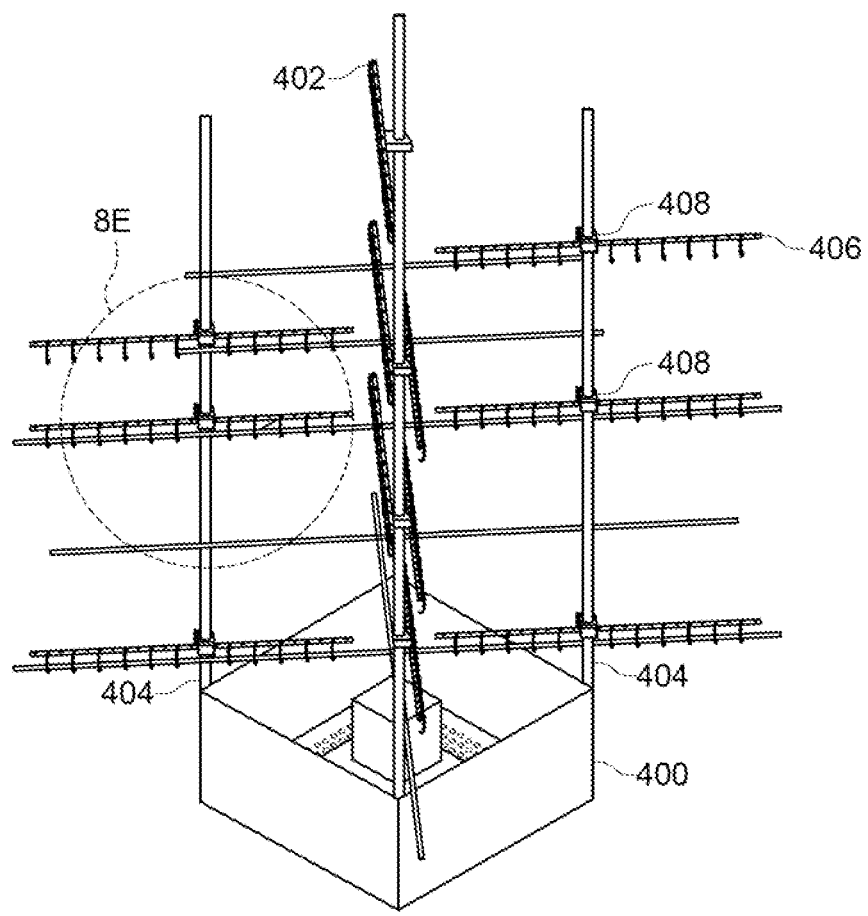
FIG. 8C is an isometric view of a pot and training tools assembly of an embodiment of an Automated Farm with Robots Working on Plants, as described herein.
Figure 8D:
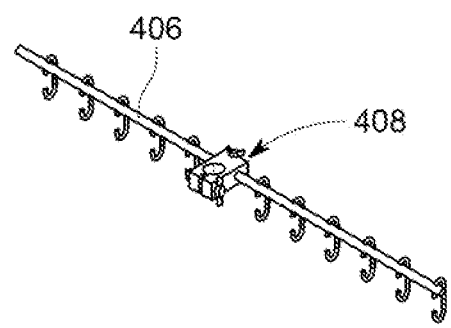
FIG. 8D is a detail view of a training tool assembly of an embodiment of an Automated Farm with Robots Working on Plants, as described herein.
Figure 8E:
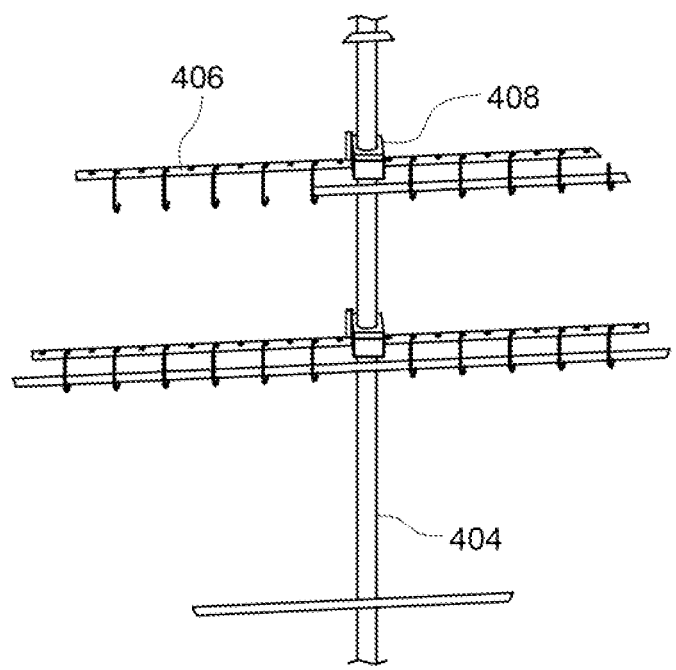
FIG. 8E is a detail view of a training tool assembly of an embodiment of an Automated Farm with Robots Working on Plants, as described herein.

Turning now to FIGS. 8A, B, C, D, and E, a top view, side view, isometric view, detail view, and detail view, respectively, of a parent plant pot and training tools assembly of an embodiment of an Automated Farm with Robots Working on Plants is shown. The parent plant pot and training tools assembly includes a parent plant pot 400 that a parent cannabis or hemp plant (not shown) will grow in, as well as a training system 402 for shaping the parent cannabis or hemp plants and guiding them to grow in a more convenient form. Parent cannabis or hemp plants are used to provide new shoots or starts, which are cut therefrom. These cuttings are then used to clone new cannabis or hemp plants. This operation guarantees that all of the cannabis or hemp plants started from clones have the same genes as their parent cannabis or hemp plants. This has several advantages including adapting and expanding as the plants grow and mature. Cannabis and hemp plants grow with their branches angled upward. When the cannabis or hemp plants are mature and large, their foliage can be dense and hard to manipulate automatically. It is advantageous to automation equipment to provide horizontal branches with starts growing upwards towards the lights.

To accomplish this, the parent plant pot and training tools assembly includes a parent plant pot 400, which may be square in shape, although the use of other shapes is contemplated. The parent plant pot 400 may be of pot metal construction, for non-limiting example, with a perforated bottom that allows water and nutrients to pass therethrough. However, it is contemplated that the parent plant pot 400 may be constructed from other materials. The parent plant pot 400 also has features that secure four corner posts 404. For non-limiting example, there may be four corner posts 404 that slide into pockets on the pot (not shown). These corner posts 404 provide a foundation for a number of training arms 406. Each training arm 406 is provided with an adjustable clamp 408 that allows the training arm 406 to slide up and down the corner post 404. The adjustable clamp 408 further allows the training arm 406 to rotate around the corner post 404. Common plant tying materials may then be used to tie the parent cannabis or hemp plant to the training arm 406. In at least one embodiment, each training arm 406 may be provided with clips, as depicted in FIGS. 8A through 8E. The training arms 406 may, for non-limiting example, be made from metal or fiberglass or other plastic materials.

Figure 9A:
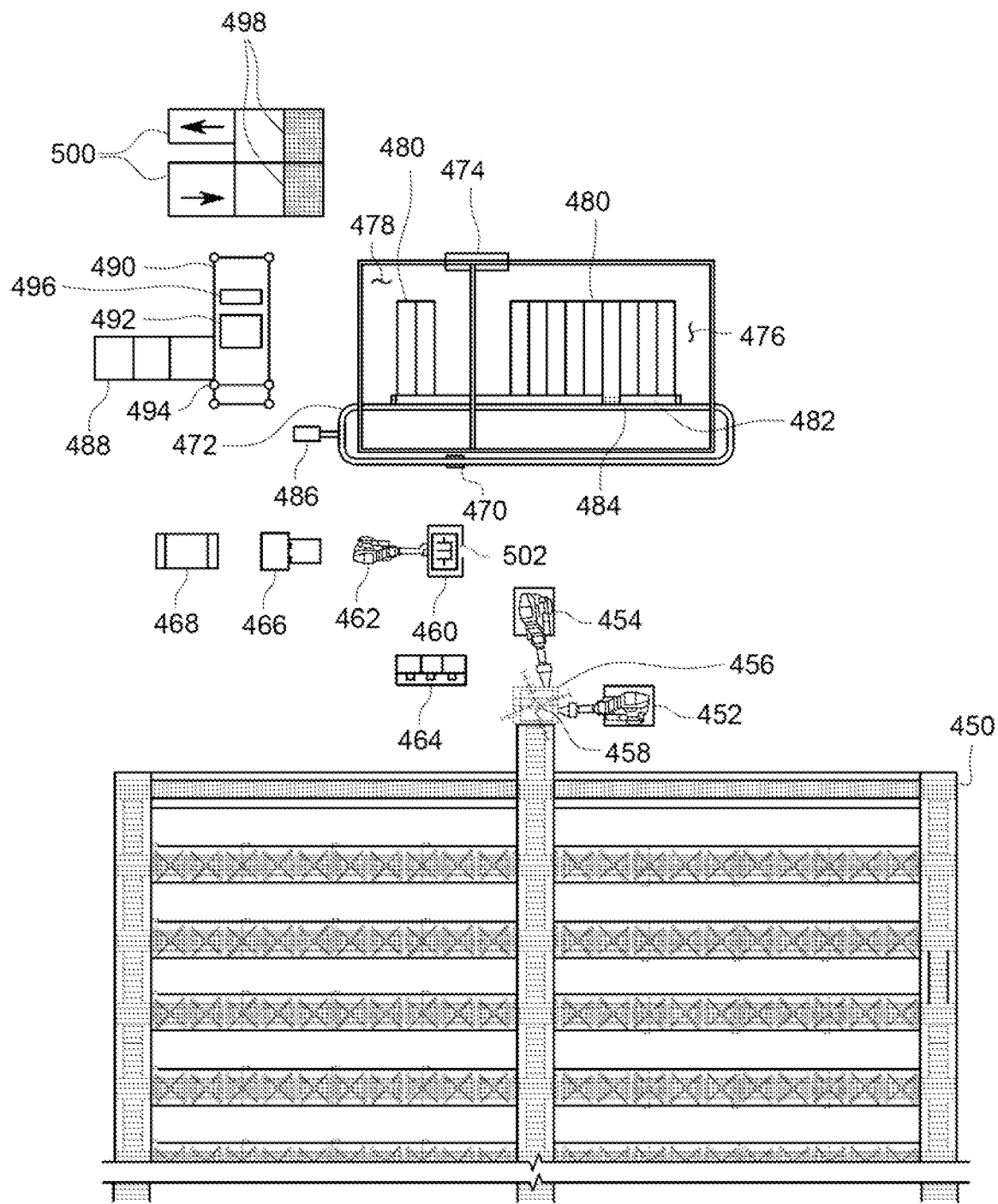
FIG. 9A is a top view of a cloning and parent plant room of an embodiment of an Automated Farm with Robots Working on Plants, as described herein.
Figure 9B:
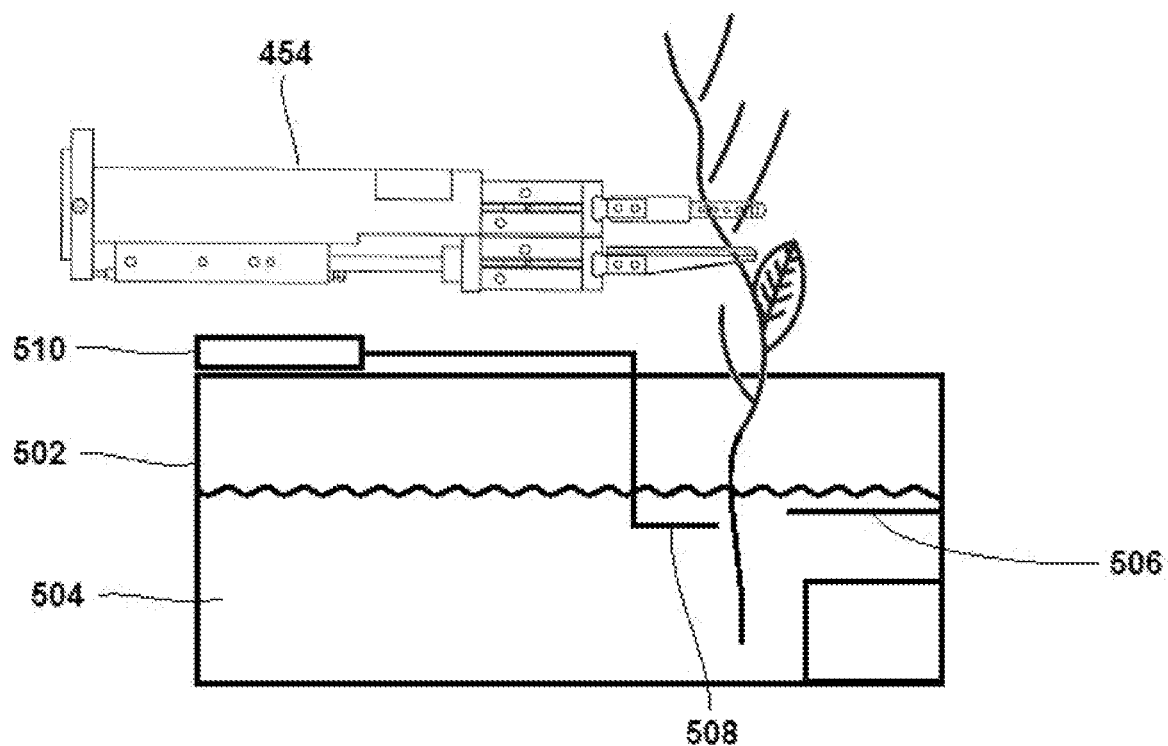
FIG. 9B is a side view of a clone preparation tank of an embodiment of an Automated Farm with Robots Working on Plants, as described herein.

FIG. 9 shows a top view of a cloning and parent plant room layout of an embodiment of an Automated Farm with Robots Working on Plants. A parent plant conveyor 450 is shown having four and a half rows of parent cannabis or hemp plants 458 for the sake of illustration. However, it is to be understood that a cloning and parent plant room layout of a given embodiment of an Automated Farm with Robots Working on Plants may have, for non-limiting example, fifty rows with twenty parent cannabis or hemp plants 458 in each row, for a total of one thousand parent cannabis or hemp plants 458. The parent cannabis or hemp plants 458 live in a controlled environment under special lighting on the parent plant conveyor 450, as shown previously. The parent cannabis or hemp plants 458 may be transported using the parent plant conveyor 450 to the watering station (not shown in FIG. 9), the inspection station (not shown in FIG. 9), and to the backlight tablet tool holding robot 452 and grip-cut tool holding robot 454 for cloning and trimming or pruning during the cloning process.

The backlight tablet tool holding robot 452 and the grip-cut tool holding robot 454 perform operations on the cannabis or hemp plant 458 upon a roller conveyor turn table 456, which receives the cannabis or hemp plant 458 from the parent plant conveyor 450. Specifically, the backlight tablet tool holding robot 452 locates a start to be taken from the parent cannabis or hemp plant 458 by the grip-cut tool holding robot 454. Once the clone has been removed from the parent cannabis or hemp plant 458, the grip-cut tool holding robot 454 takes the clone to a clone preparation tank 502 mounted on a clone planting pedestal 460 that contains a rooting hormone solution 504. The grip-cut tool holding robot 454 dips the clone in the clone preparation tank 502. While the clone is submerged, two blades 506 and 508, one fixed blade 506 that is fixed to the clone preparation tank 502 and a movable blade 508 that is on an actuator 510, work together to rough up the bottom of the stem so the clone has a better Interaction with the rooting hormone solution 504. Then the grip-cut tool holding robot 454 moves the clone over onto clone planting pedestal 460. Then the grip-cut tool holding robot 454 places the clone in a Rockwool plug that has been prepared by a Rockwool plug robot 462.

The Rockwool plugs come to the operation in large totes. A tote full of plugs is dumped as needed into a flex feeder 466 by a tote dumper 468. The flex feeder 466 has a backlit bottom that shakes up and down to randomly arrange plugs for the Rockwool plug robot's vision system. The flex feeder 466 presents the Rockwool plugs to the Rockwool plug robot 462. The Rockwool plug robot 462 picks up the plug and rinses it in the three solutions in pH controlled rinse tanks 464. Then the Rockwool plug robot 462 places the Rockwool plug on the clone planting pedestal 460 where the grip-cut tool holding robot 454 inserts the clone into the Rockwool plug. The Rockwool plug robot 462 then puts the planted clone in a child tray 470 located on the child conveyor 472.

A nursery has two separate chambers, a first larger nursery chamber 476 for newly planted clones, and a second nursery chamber 478 for more developed clone child cannabis or hemp plants. Each of the nursery chambers is provided with temperature and humidity controls 474. The second nursery chamber 478 has less humidity than the first nursery chamber 476, and prepares the more developed clone child cannabis or hemp plants for the grow rooms. Plant racks 480 in the first and second nursery chambers 476 and 478 provide a location for the cloned cannabis or hemp plants to grow, and are provided four levels each for this purpose. The bottom of each level of the plant rack 480 has gravity skate wheels for the child tray 470 to ride on. A lifting device (not shown) at the back of each plant rack 480 lifts one end of the bottom of each level up causing the gravity skate wheels to shuttle the child trays 470 out as needed.

A transporter track 482 along the front of the plant racks 480 is provided with a transporter 484 that moves back-and-forth across the front of the plant racks 480. The transporter 484 is provided with a shelf (not shown) that moves up and down to the four levels of the plant racks 480. In order to put a child tray 470 of newly planted clones into a plant rack 480, the transporter 484 positions itself in front of that plant rack 480. The shelf of the transporter 484 then raises to the correct level and transfers the child tray 470 to the plant rack 480 by pushing the child tray 470 into the plant rack 480. The shelf of the transporter 484 has the ability to move a child tray 470 in and out of the plant rack 480 as well as on and off of the child conveyor 472.

When the cloned cannabis or hemp plants are fully mature, they may be sold or moved to grow rooms either in trays of small Rockwool plugs or in trays of Rockwool plugs that have been transplanted into their larger Rockwool cube. The system for preparing Rockwool cubes includes a conveyor 488 that conveys pallets full of Rockwool cubes, which are 6"×6"×6" in size. A gantry frame 490 has a gantry head with integrated shelf 494, and is used to move a row of cubes. A top layer pusher and scissor lift 492 separates a layer of Rockwool cubes and moves them to preparation tanks 496. A transplant robot 486 then moves completed clones to the trays or to Rockwool cubes. Finally the completed clones are staged in dunnage 498 and prepared for delivery using a conveyor 500.

Turning now to FIGS. 10A, 10B, and 10C, a portable spray station 550 is shown having a lightweight frame 552 and wheels 554, and Is approximately six feet wide. The portable spray station 550 is provided with a handle 556, so that a person can pull the portable spray station 550 similar to a wagon. The portable spray station 550 is further provided with a fluid tank and pump system 558, a compressor tank 566, and an air hose and control power cord 560. In this way, the portable spray station 550 may be plugged into a power and air supply between rooms, whereupon the portable spray station 550 may lock into sockets in the floor. A control system 562 is provided, as well as spray nozzles 564, of which there may be four, for non-limiting example. The four spray nozzles 564 may positioned to spray the cannabis or hemp plants as they pass down the conveyor. For non-limiting example, there may be twelve inches between sprayer columns.

Room is provided between the four spray nozzles 564 for a door or section of a conveyor to drop into, whereupon photo eyes (not shown) of the control system 562 activate the portable spray station 550. In this way, the portable spray station 550 is used to spray material on cannabis or hemp plants for their well-being. It can also be used to clean the cannabis or hemp plants. The portable spray station 550 can be positioned at many points in the farm. As noted previously, the portable spray station 550 is able to locate under a conveyor section where the plants will pass. In this way, portable spray station 550 is able to spray the plants as they pass down the conveyors, or as they cross a hallway.

Figure 11:
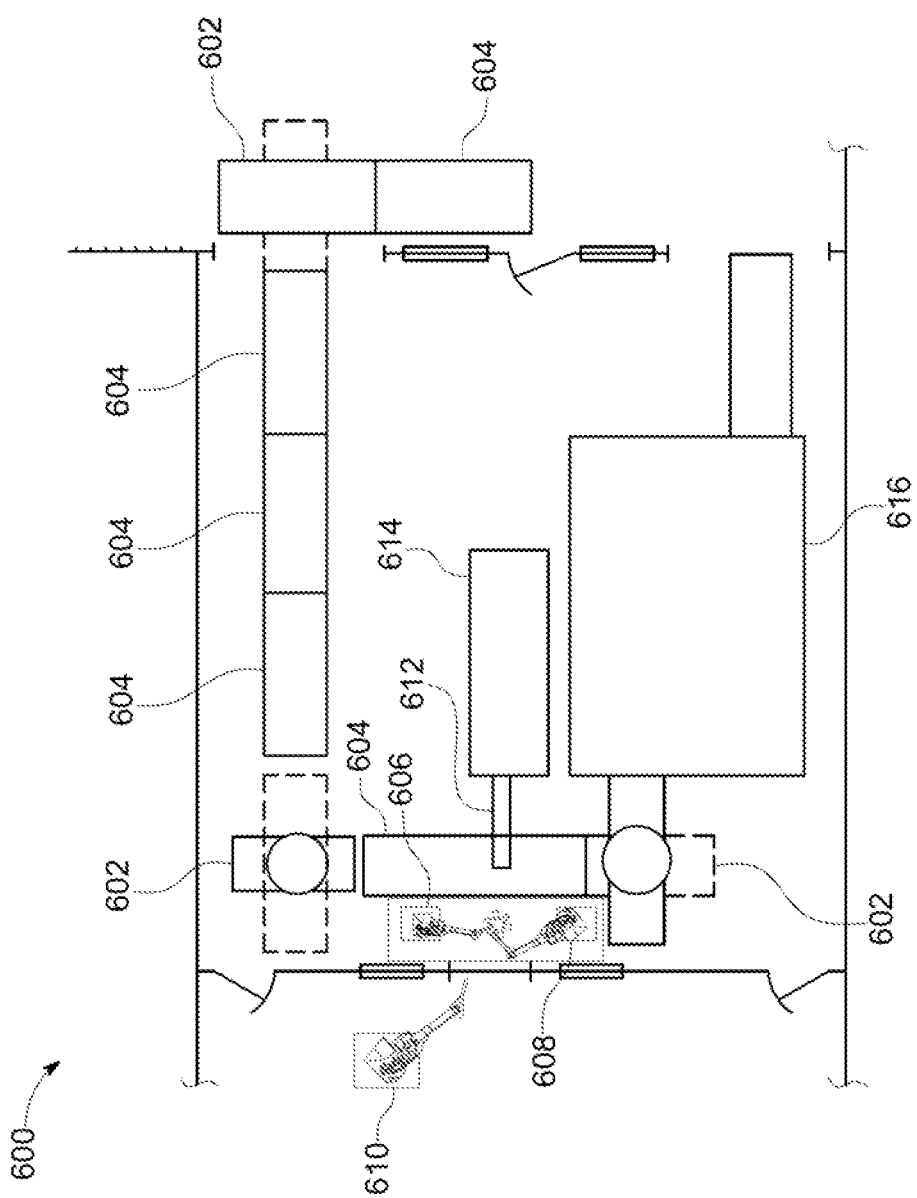
FIG. 11 is a plan view of an automated harvesting cell of an embodiment of an Automated Farm with Robots Working on Plants, as described herein.

Turning now to FIG. 11, a plan view of an automated harvesting cell 600 of an embodiment of an Automated Farm with Robots Working on Plants is shown. In the automated harvesting cell 600, trays of cannabis or hemp plants are transported by standard conveyor sections 604 to the harvest room. In order to change the direction of motion of the trays of plants, a conveyor turntable 602 may lift and rotate a pallet full of plants. Further standard conveyor sections 604 and conveyor turntables 602 position the cannabis or hemp plants front of a backlight tablet tool holding robot 606, a grip-cut tool holding robot 608, and/or a trimming or pruning robot system 610, which cooperate to remove flowers and any other unwanted parts of the cannabis or hemp plants. These wanted and unwanted cannabis or hemp plant parts are sorted and put in their proper place for further processing. Meanwhile, the grip-cut tool holding robot 608 discards used Rockwool to a conveyor 612 that leads to a Rockwool baler 614. The Rockwool baler 614 is a baler that compresses the used Rockwool, making it easier to discard. The empty tray, in turn, proceeds by way of a standard conveyor section 604 and another conveyor turntable 602 to a tray wash and dry system 616.

Figure 12:
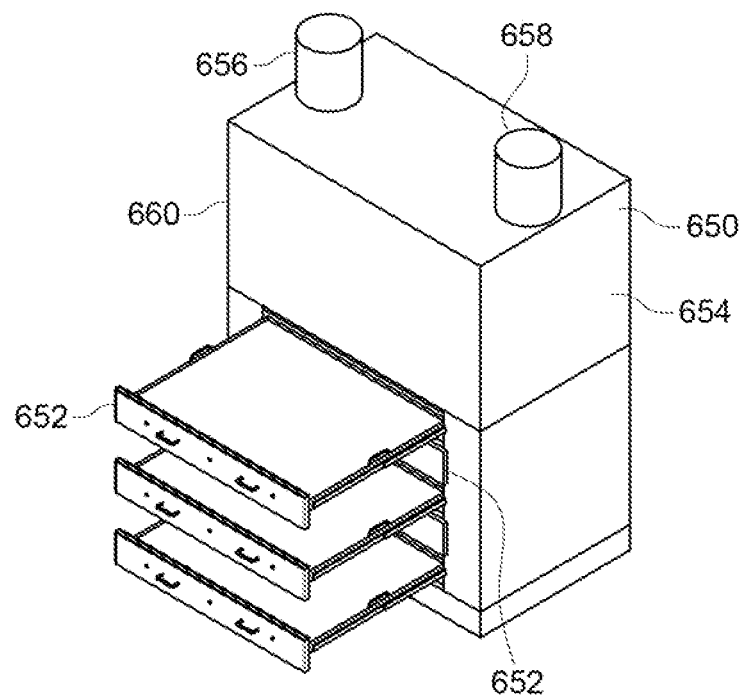
FIG. 12 is an isometric view of a curing cabinet system of an embodiment of an Automated Farm with Robots Working on Plants, as described herein.

FIG. 12 shows a curing cabinet 650 having five drawers 652. It is contemplated that the number and relative size of the drawers 652 of the curing cabinet 650 may vary. The curing cabinet 650 conditions the buds or flowers taken from the cannabis or hemp plants so that they are more pleasant to smoke. Curing the buds or flowers takes time and is aided by heating and cooling cycles, as well as application of the proper humidity. The top of the curing cabinet 650 contains an air exchange system 654 having an intake filter 656 and a charcoal exhaust filter 658. The air exchange system 654 circulates exchange air around the buds or flowers as they are sitting in the drawer 652 on a screen. A control system 660 based on an industrial PLC is programmable to Implement a complete curing cycle over many days, for each drawer 652 of buds or flowers. The drawers 652 of the curing cabinet 650 each have a lift out screen mentioned previously for promoting circulation and for handling the buds or flowers.

Figure 13:
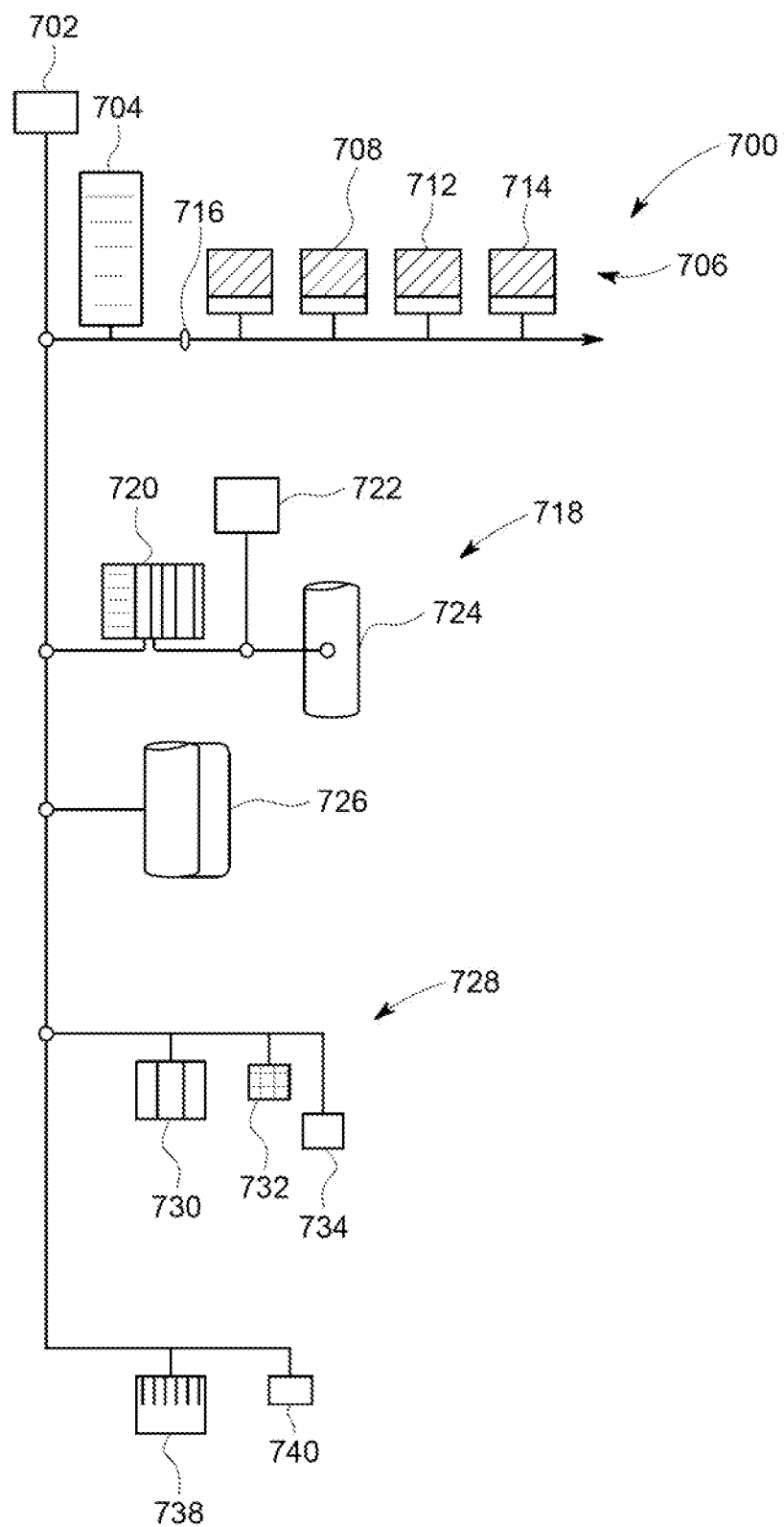
FIG. 13 is a graphic representation of a farm control and data management system of an Automated Farm with Robots Working on Plants, as described herein.

FIG. 13 shows a graphic representation of a farm control and data management system of an embodiment of an Automated Farm with Robots Working on Plants. The farm control and data management system is based on a control system network 700 that is connected to a farm server 704. The control system network 700 has a modem 702 and an Ethernet 716, as well as several office PCs 706, which may include, as non-limiting examples, an office PC for each of a farm manager 708, technical support 710, a master gardener 712, and sales 714. The control system network 700 may further be connected to, as a non-limiting example, a cloning cell 718 having a programmable logic controller 720 for the robots and other equipment, a robot vision controller 724, and a human machine interface 722. The cloning cell 718 shown in FIG. 13 is representative, such that multiple similar arrangements may be provided for planting cells, pruning or trimming cells, and harvesting cells, and tray wash cells, for non-limiting example.

Similarly, the control system network 700 may further be connected to room controllers 728 having programmable logic controllers 730 for the robots and other equipment, robot vision systems 734, and human machine Interfaces 732. Multiple similar arrangements may be provided for rooms having conveyors, fans, watering stations, testing stations, spray stations, and/or inspection cameras. The control system network 700 may further be connected to a hallway conveyor control 736 having a programmable logic controller 738 and a human machine interface 740. A main programmable logic controller 726 may be provided to coordinate the functions of the Automated Farm with Robots Working on Plants, as well as to control miscellaneous functions such as lighting control, CO2 control, HVAC control, and/or humidity control. Generally, the control system network 700 operates all aspects of the farm automation. The control system network 700 may also log a large amount of data including atmospheric conditions and pictures of the plants.

Figure 14A:
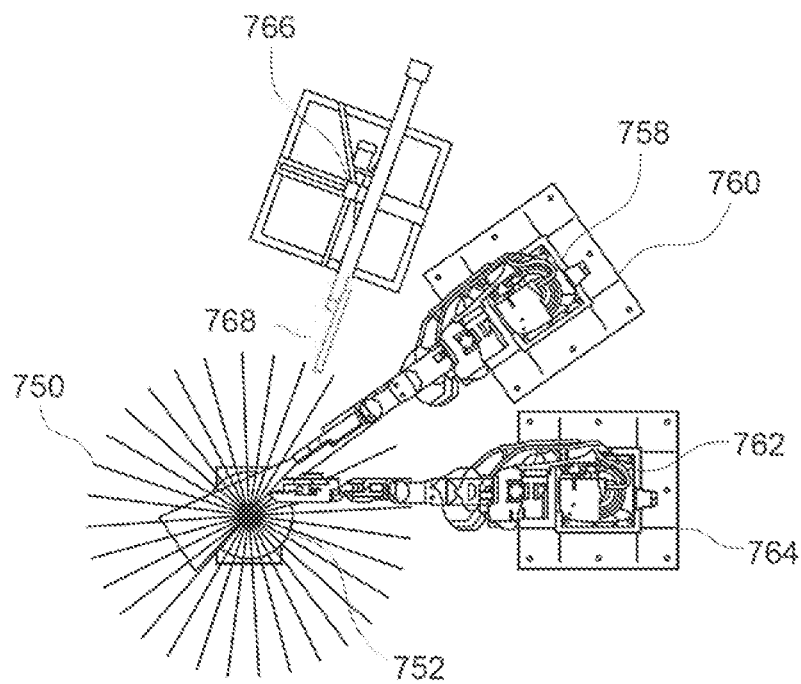
FIG. 14A is a top view of two robots of an embodiment of an Automated Farm with Robots Working on Plants, as described herein.
Figure 14B:
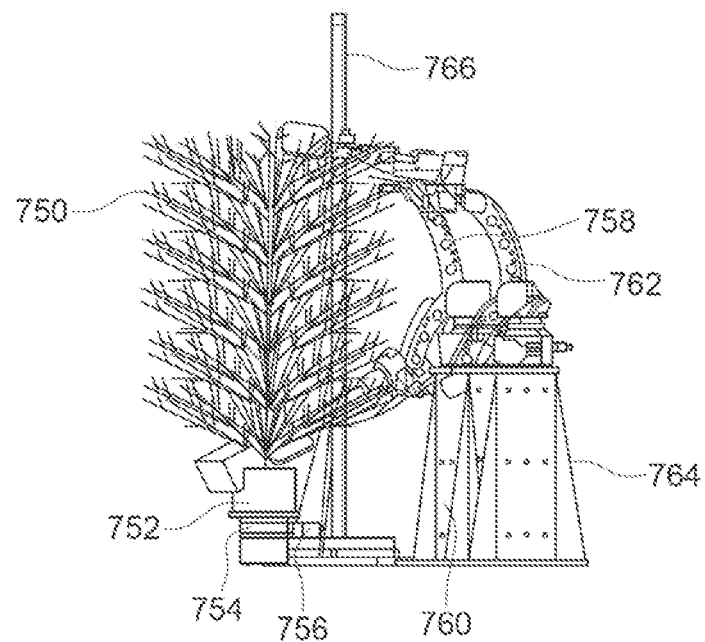
FIG. 14B is a side view of two robots of an embodiment of an Automated Farm with Robots Working on Plants, as described herein.
Figure 14C:
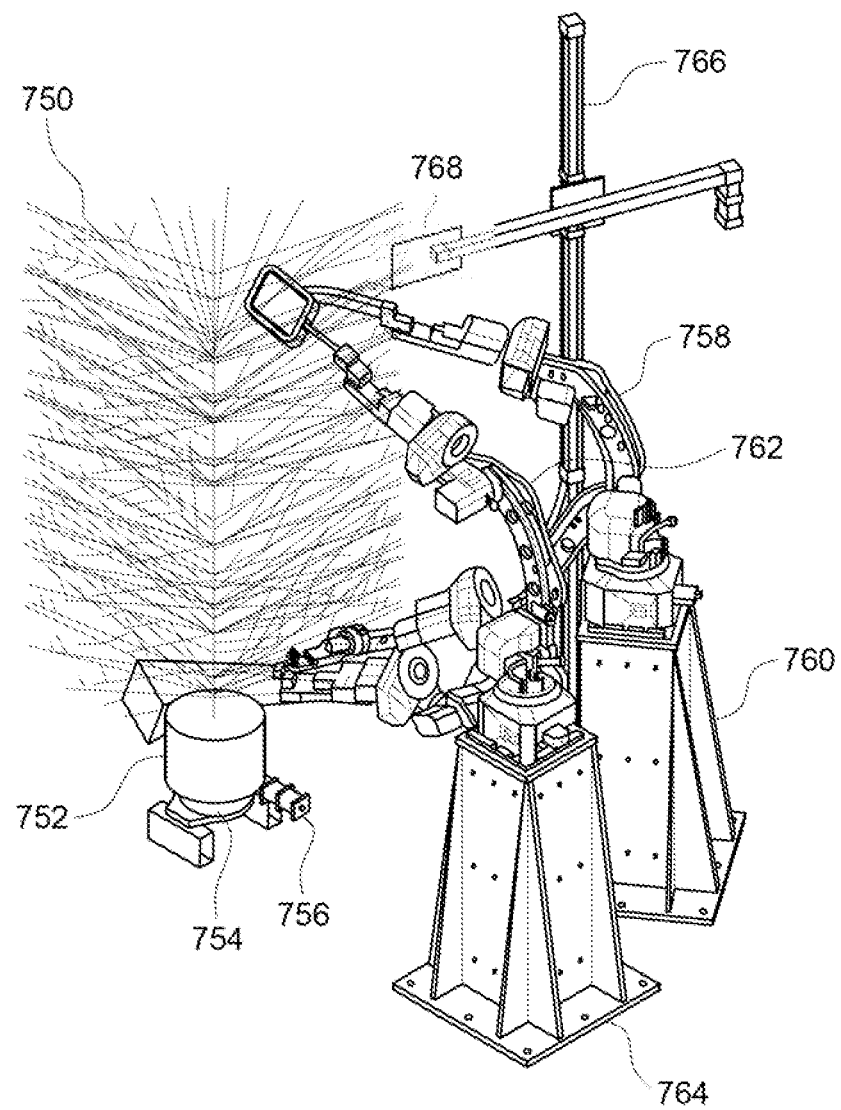
FIG. 14C is an isometric view of two robots of an embodiment of an Automated Farm with Robots Working on Plants, as described herein.
Figure 15A:
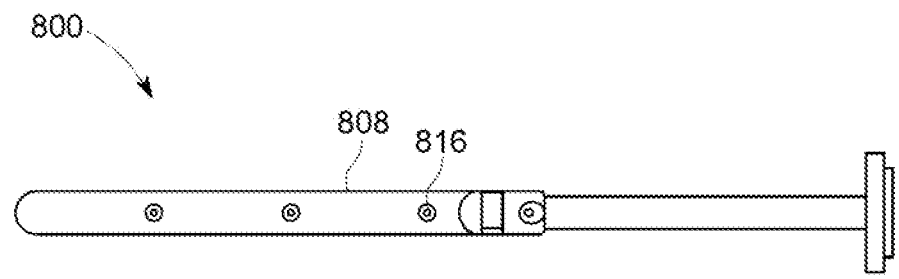
FIG. 15A is a top view of a backlight assembly of a robot of an embodiment of an Automated Farm with Robots Working on Plants, as described herein.
Figure 15B:
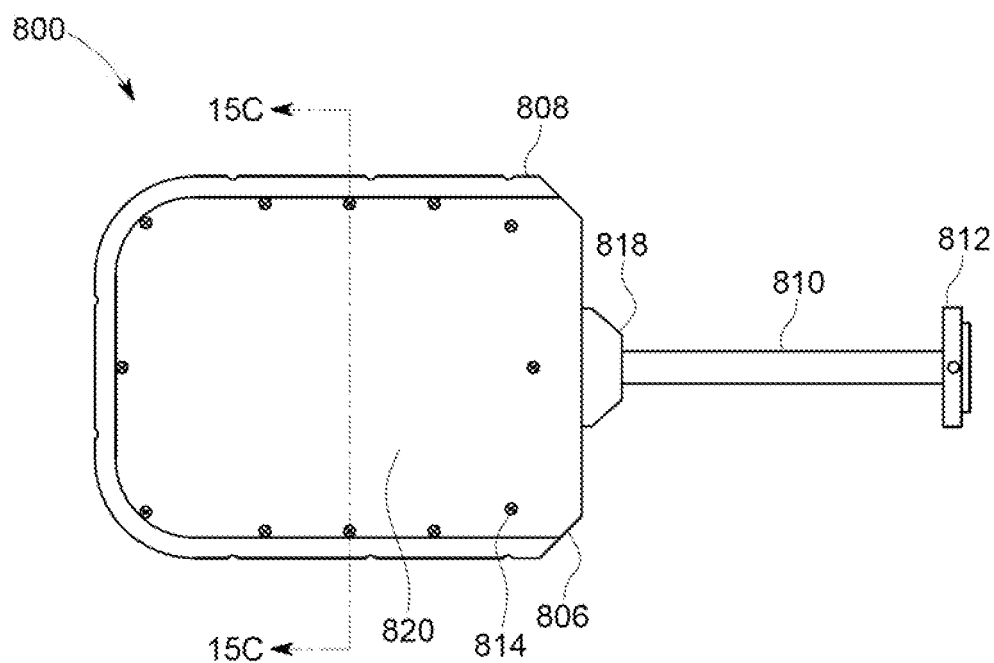
FIG. 15B is a front view of a backlight assembly of a robot of an embodiment of an Automated Farm with Robots Working on Plants, as described herein.
Figure 15C:
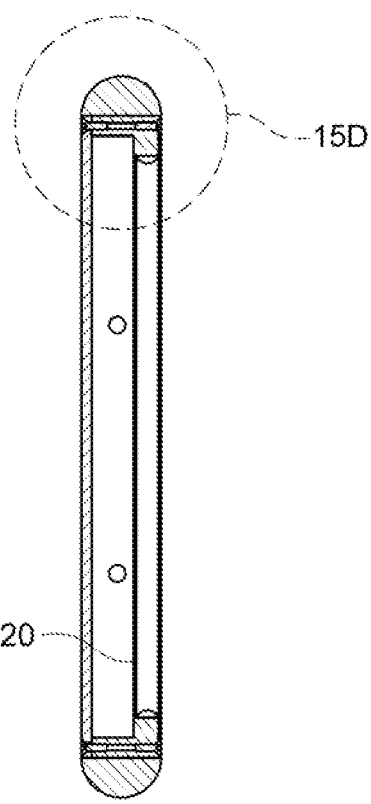
FIG. 15C is a sectional end view of a backlight assembly of a robot of an embodiment of an Automated Farm with Robots Working on Plants, as described herein.
Figure 15D:
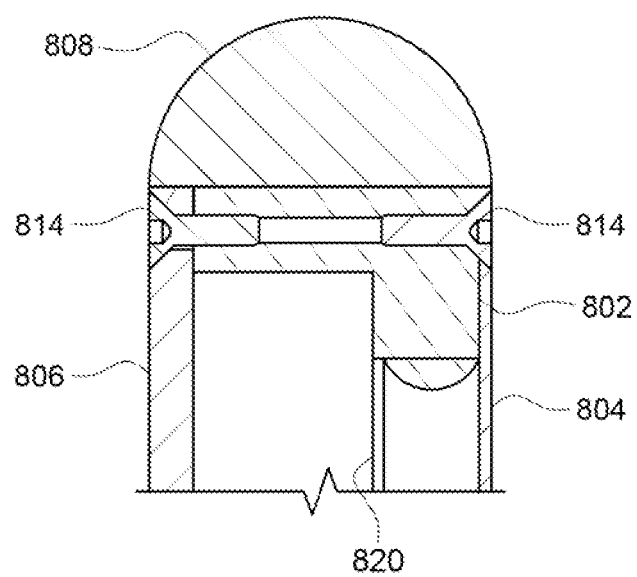
FIG. 15D is a detail view of a backlight assembly of a robot of an embodiment of an Automated Farm with Robots Working on Plants, as described herein.
Figure 15E:
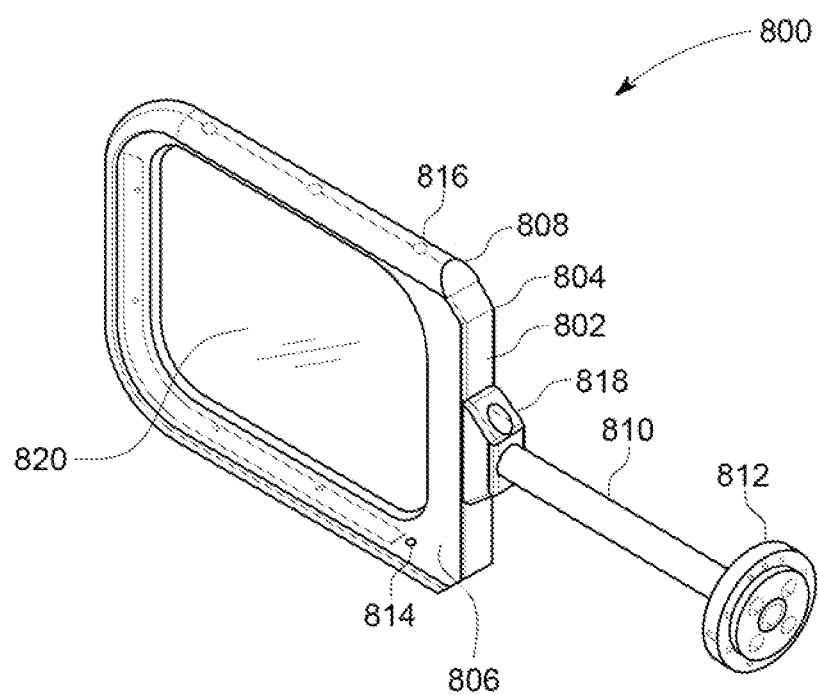
FIG. 15E is an isometric view of a backlight assembly of a robot of an embodiment of an Automated Farm with Robots Working on Plants, as described herein.

Turning now to FIGS. 14A, 14B, and 14C, a top view, a side view, and an isometric view, respectively, of two robots 758 and 762 of an embodiment of an Automated Farm with Robots Working on Plants are shown. As part of the process, a cannabis or hemp plant 750 in a parent plant pot 752 is placed on a parent plant pot turntable 754 having a pot rotating motor 756. A backlight tablet tool holding robot 758 is mounted on a backlight tablet tool holding robot pedestal 760, and a grip-cut tool holding robot 762 is mounted on a grip-cut tool holding robot pedestal 764. As before, the grip-cut tool holding robot 762 generally maintains the grip-cut tool in a position perpendicular and centered to the backlight tablet tool held by the backlight tablet tool holding robot 758. The backlight tablet tool holding robot 758 systematically moves the backlight tablet tool through the plant while the camera of the grip-cut tool holding robot 762 looks for an ideal cloning, trimming or pruning, harvesting, and/or maintaining situation. When the ideal cloning, trimming or pruning, harvesting, and/or maintaining situation presents itself to the vision system, the backlight tablet tool holding robot 758 stops and the grip-cut tool holding robot 762 moves in a perpendicular motion to the backlight tablet tool, towards the plant. The grip-cut tool holding robot 762 grips the cannabis or hemp plant 750 and cuts the branch, leaf, or flower to be removed.

Additionally, a plant manipulator 766 is provided. The plant manipulator's positioning is controlled by two servomotors (not shown). The plant manipulator 766 reaches into the plant using a manipulator attachment 768 as the parent pot turntable 754 moves, thereby pushing the plant's branches against the manipulator attachment 768. This action opens an area for the backlight tablet tool holding robot 758 and the grip-cut tool holding robot 762 to work on the cannabis or hemp plant 750, thereby further facilitating the process of cloning, trimming or pruning, harvesting, inspecting, and maintaining.

Turning now to FIGS. 15A, 15B, 15C, 15D, and 15E, a top view, a front view, a sectional end view, a detail view, and an isometric view, respectively, of a backlight assembly 800 of an embodiment of an Automated Farm with Robots Working on Plants is shown. A backlight enclosure plate 802, a backlight backing plate 804, and a backlight cover plate 806 defines a cavity containing a backlight screen 820. The backlight backing plate 804 and the backlight cover plate 806 are attached to the backlight enclosure plate 802 using Torx flat head screws 814. Backlight edging 808 is attached to the outward periphery of the backlight enclosure plate 802 using socket head cap screws 816, in order to protect the backlight assembly 800 as it is maneuvered within the cannabis or hemp plant. A backlight adapter 818 connects the backlight enclosure plate 802 to a backlight robot adapter extension 810, which is in turn connected to a backlight robot adapter 812. The backlight robot adapter 812 interconnects the backlight assembly 800 to the backlight tablet tool holding robot (not shown).

Figure 16A:
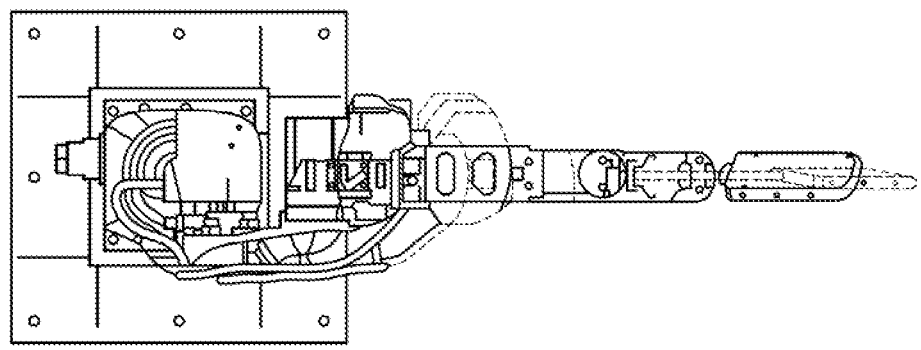
FIG. 16A is a top view of a robot having a light assembly of an embodiment of an Automated Farm with Robots Working on Plants, as described herein.
Figure 16B:
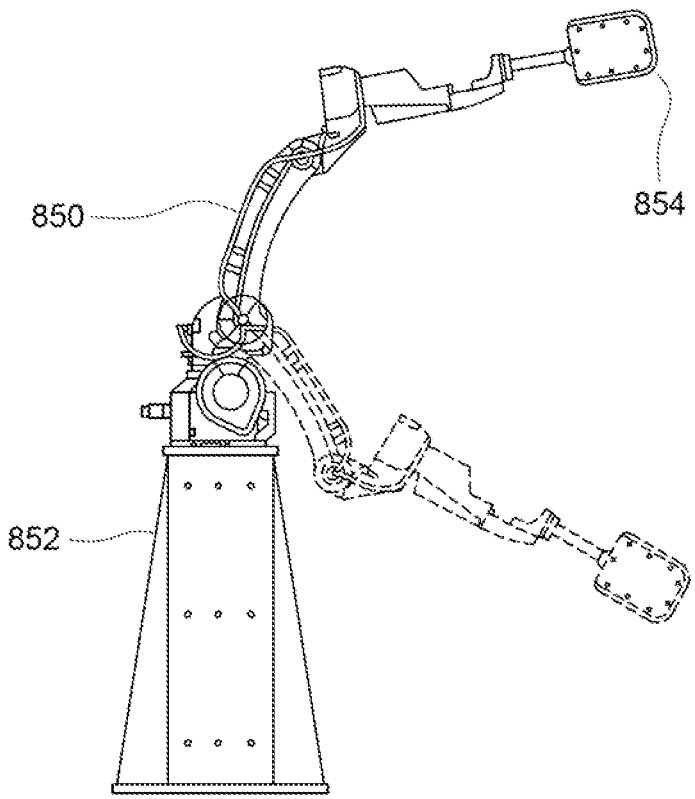
FIG. 16B is a side view of a robot having alight assembly of an embodiment of an Automated Farm with Robots Working on Plants, as described herein.
Figure 16C:
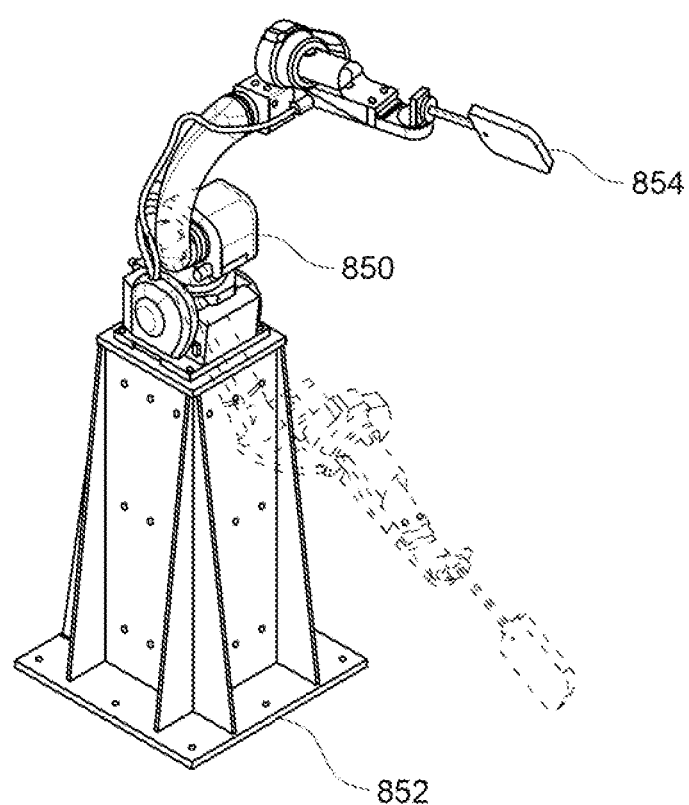
FIG. 16C is an isometric view of a robot having a light assembly of an embodiment of an Automated Farm with Robots Working on Plants, as described herein.
Figure 17A:
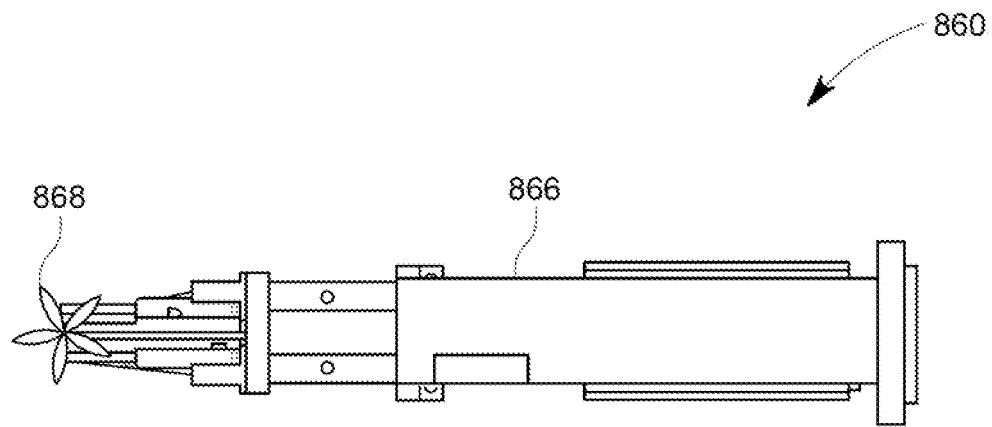
FIG. 17A is a top view of a grip-cut of a robot of an embodiment of an Automated Farm with Robots Working on Plants, as described herein.
Figure 17B:
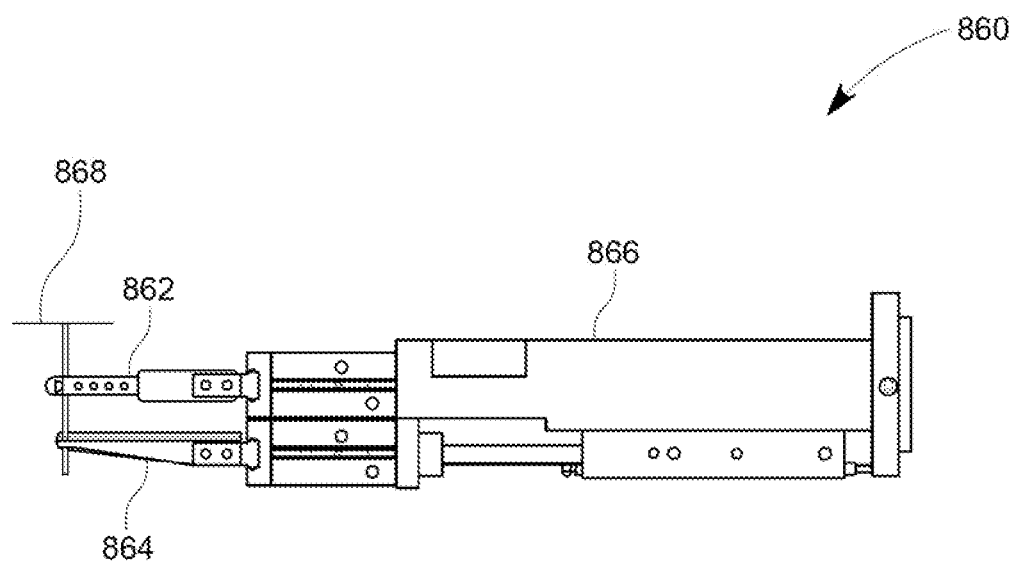
FIG. 17B is a side view of a grip-cut of a robot of an embodiment of an Automated Farm with Robots Working on Plants, as described herein.
Figure 17C:
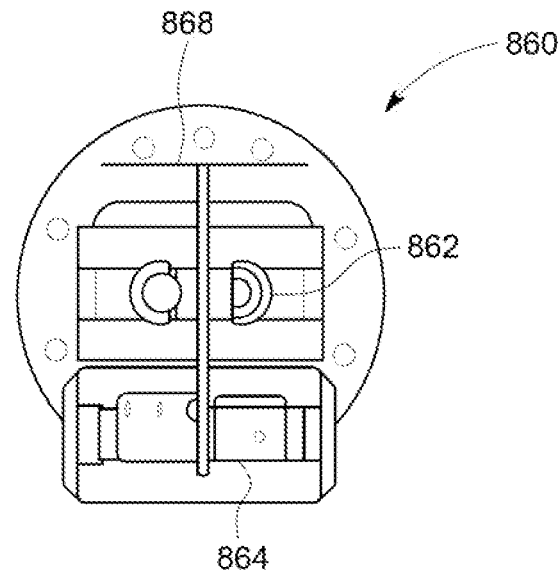
FIG. 17C is an end view of a grip-cut of a robot of an embodiment of an Automated Farm with Robots Working on Plants, as described herein.
Figure 17D:
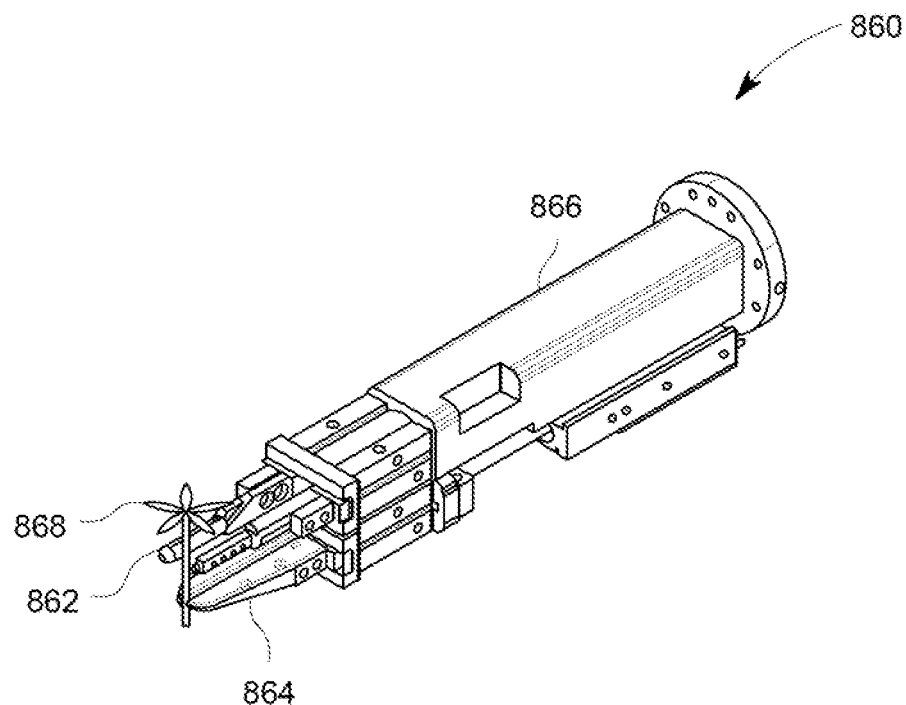
FIG. 17D is an isometric view of a grip-cut of a robot of an embodiment of an Automated Farm with Robots Working on Plants, as described herein.

FIGS. 16A, 16B, and 16C, in turn, show a top view, a side view, and an isometric view, respectively, of a backlight tablet tool holding robot 850 of an embodiment of an Automated Farm with Robots Working on Plants. The backlight tablet tool holding robot 850 is shown in two different articulated positions, in order to illustrate a range of motion of the backlight tablet tool holding robot 850. The backlight tablet tool holding robot 850 is mounted on a backlight tablet tool holding robot pedestal 852. A backlight assembly 854 as shown in FIGS. 15A through 15E is connected to the backlight tablet tool holding robot 850.

Turning now to FIGS. 17A, 17B, 17C, and 17D, a top view, a side view, an end view, and an isometric view, respectively, of a grip-cut tool 860 of an embodiment of an Automated Farm with Robots Working on Plants is shown. The grip-cut tool 860 is provided with a plant sensor 862, which is used to verify the location of the cannabis or hemp plant 868 when preparing to grip or cut it. The grip-cut tool 860 is further provided with a grip-cutter 864, which is actuated by a grip-cutter actuator 866.

Figure 18A:
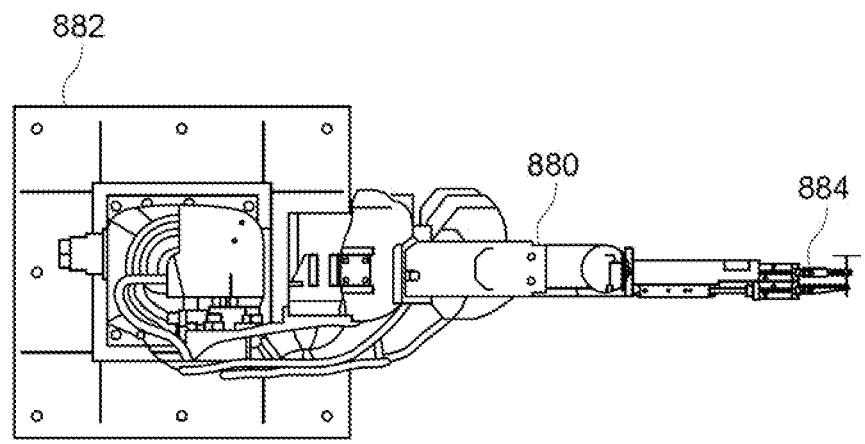
FIG. 18A is a top view of a robot having a grip-cut of an embodiment of an Automated Farm with Robots Working on Plants, as described herein.
Figure 18B:
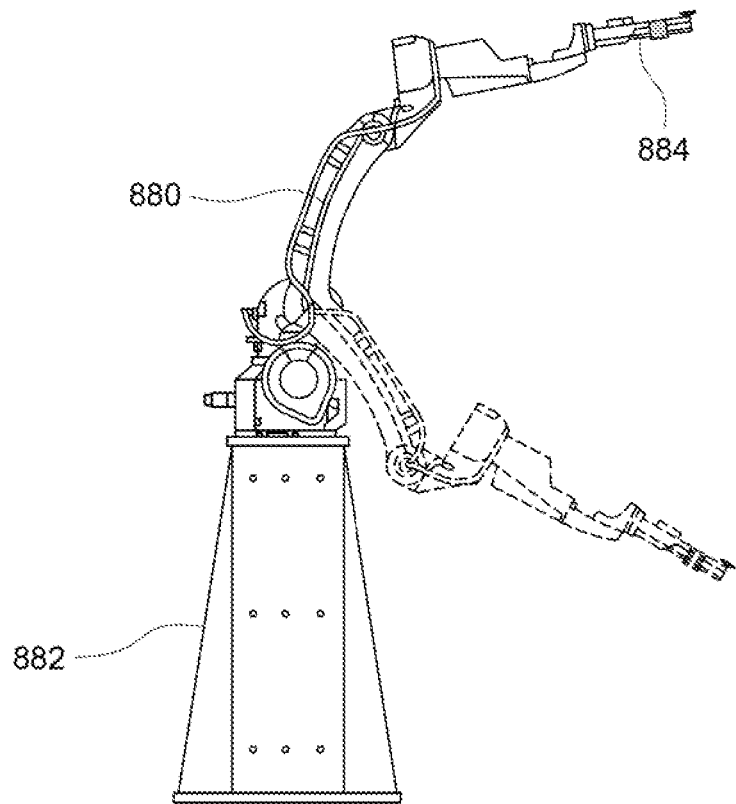
FIG. 18B is a side view of a robot having a grip-cut of an embodiment of an Automated Farm with Robots Working on Plants, as described herein.
Figure 18C:
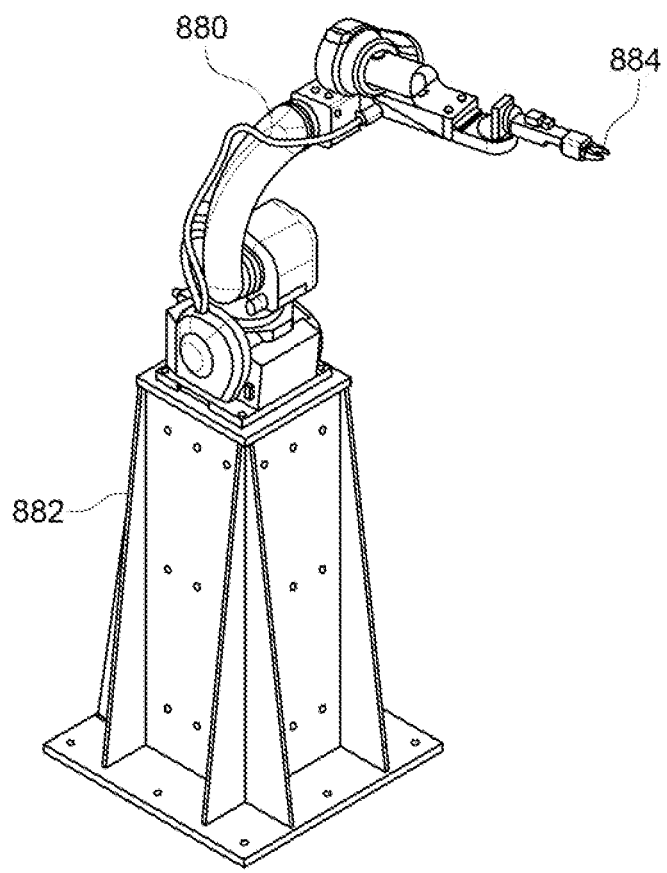
FIG. 18C is an isometric view of a robot having a grip-cut of an embodiment of an Automated Farm with Robots Working on Plants, as described herein.

FIGS. 18A, 18B, and 18C, in turn, show a top view, a side view, and an isometric view, respectively, of a grip-cut tool holding robot 880 of an embodiment of an Automated Farm with Robots Working on Plants. The grip-cut tool holding robot 880 is shown in two different articulated positions, in order to illustrate a range of motion of the grip-cut tool holding robot 880. The grip-cut tool holding robot 880 is mounted on a grip-cut tool holding robot pedestal 882. A grip-cut tool 884 as shown in FIGS. 17A through 17D is connected to the grip-cut tool holding robot 880.

Figure 19A:
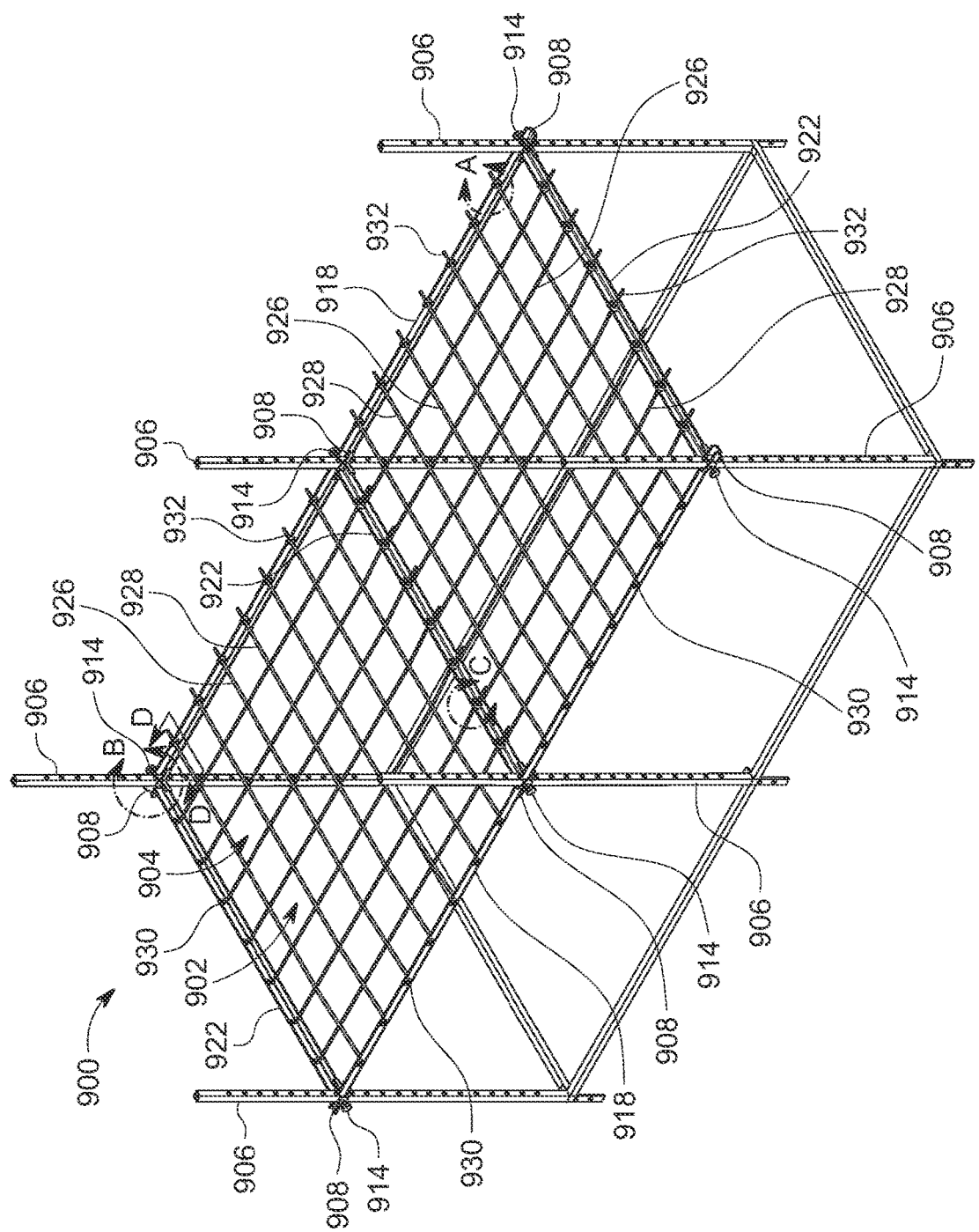
FIG. 19A is a top left isometric view of an embodiment of the Tray and Trellis System for the Automated Farm with Robots Working on Plants, as described herein.
Figure 19B:
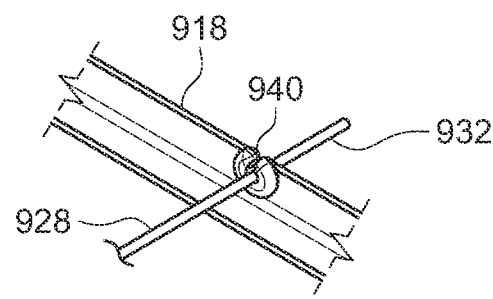
FIG. 19B is a detail view thereof.
Figure 19C:
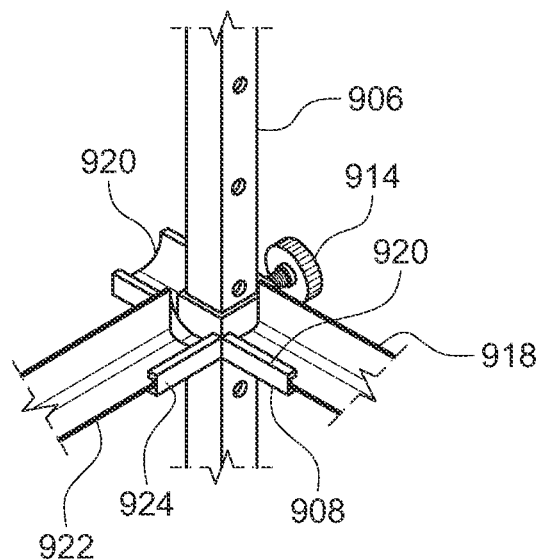
FIG. 19C is a detail view thereof.
Figure 19D:
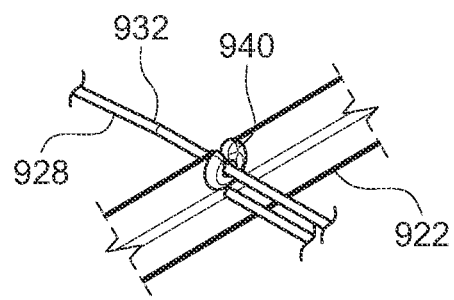
FIG. 19D is a detail view thereof.

Turning now to FIGS. 19A, 19B, 19C, and 19D, an embodiment of the Tray and Trellis System 900 for the Automated Farm with Robots Working on Plants is shown. The embodiment of the Tray and Trellis System 900 may be arranged over the top of a pot, tray, sliding bench, or existing framework (not shown) similar to the tray 302 of the non-limiting exemplary embodiment of the tray and trellis system 300 shown in FIGS. 6A, 6B, 6C, and 6D, for non-limiting example, or may be arranged over a pot, tray, sliding bench, existing framework, or other growing arrangement of other configuration. Vertical posts or legs 906 are connected to one another by way of longitudinal members 918 and cross members 922, which may include upper and lower longitudinal members 918 and cross members 922 as shown. The longitudinal members 918 and cross members 922 may be connected to the vertical posts or legs 906 using corner or three way supports 908. As shown in FIG. 19C, each corner or three way support 908 is provided with longitudinal member holders 920 for supporting the longitudinal members 918, and a cross member holder 924 for supporting a cross members 922. Each corner or three way support 908 is capable of being moved vertically along the vertical post or leg 906, and may be held in position using a thumbscrew 914. Alternately, the corner or three way support 908 may be held in position using a tab or other binding mechanism (not shown).

The longitudinal members 918 and cross members 922 are provided with tines 928 to support the cannabis plants, the crossed tines 928 creating a trellis 902 defining a trellis grid 904. The tines 928 are fixed at their tine fixed ends 930 to the longitudinal members 918 on one side of the Tray and Trellis System 900, and are releasably engaged to the longitudinal members 918 at their tine tail ends 932 on the other side of the Tray and Trellis System 900. Similarly, the tines 928 are fixed to one end cross member 922 or intermediate cross member 922 at their tine fixed ends 930, and are releasably engaged to another end cross member 922 or intermediate cross member 922 at their tine tail ends 932. Each longitudinal member 918 and cross member 922 that is fixed to the tines 928 at their tine fixed ends 930, together with the fixed tines 928 make up a comb 926. Each comb 926 can be easily slid out of engagement with the trellis 902 by sliding the comb 926 away from the releasable engagement between the longitudinal member 918 or cross member 922 at the tine tail ends 932 on the opposite side of the Tray and Trellis System 900. In the embodiment of the Tray and Trellis System 900 shown in FIGS. 19A, 19B, 19C, and 19D, each releasable engagement between the tine tail end 932 and the longitudinal member 918 or cross member 922 is embodied as an open grommet 940, each open grommet 940 being engaged with a separate recess in the longitudinal member 918 or cross member 922.

Figure 20:
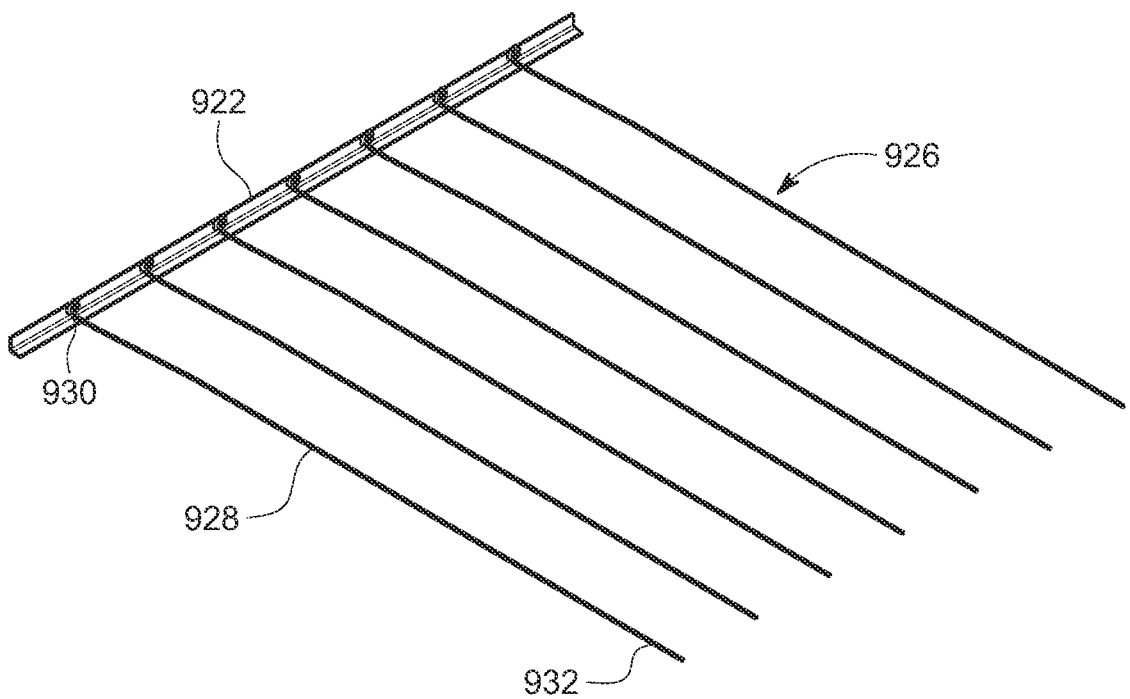
FIG. 20 is an isometric view of a comb of an embodiment of the Tray and Trellis System for the Automated Farm with Robots Working on Plants, as described herein.
Figure 21:
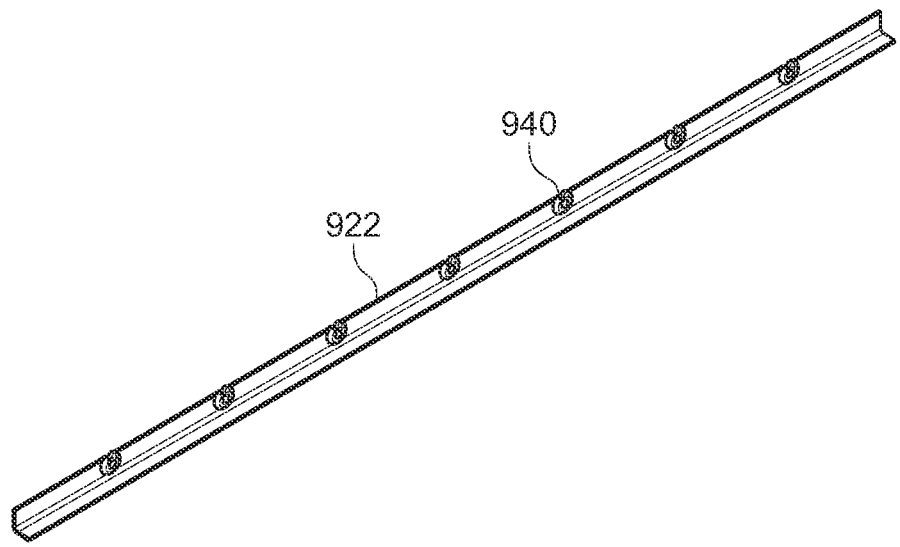
FIG. 21 is an isometric view of a cross member of an embodiment of the Tray and Trellis System for the Automated Farm with Robots Working on Plants, as described herein.

Turning now to FIGS. 20 and 21, a cross member 922 of the Tray and Trellis System 900 is shown. The cross member 922 is provided with multiple tines 928, so that the cross member 922 and the multiple tines 928 together form a comb 926. In FIG. 20, the multiple tines 928 are fixed to the cross member 922 at their tine fixed ends 930, which fixation may be by welding, bonding, or fastening, for non-limiting example. In FIG. 21, the cross member 922 is provided with multiple open grommets 940. The open grommets 940 describe incomplete circles, so that they are open in one vertically perpendicular direction, and are inserted into openings in the cross member 922. The openings each have a narrow neck and a wide recess, with the openings in the grommets 940 aligned with the narrow necks, so that the open grommets 940 are retained therein. In this way, the tine tail ends 932 of the multiple tines 928 of one comb 926 may be snapped downwards into the grommets 940 perpendicular to the multiple tines' 928 axis. When desired, the comb 926 may be withdrawn horizontally along the axis of the multiple tines 928, which removal is facilitated by the sliding engagement between the open grommets 940 and the multiple tines 928. As illustrated in the non-limiting embodiment of the cross member 922 of the Tray and Trellis System 900 of FIG. 20, a cross member 922 may be provided both with multiple tines 928 fixed to the cross member 922 at their tine fixed ends 930 and open grommets 940 suitable to receive the tine tail ends 932 of multiple tines 928 from another cross member 922.

Figure 22:
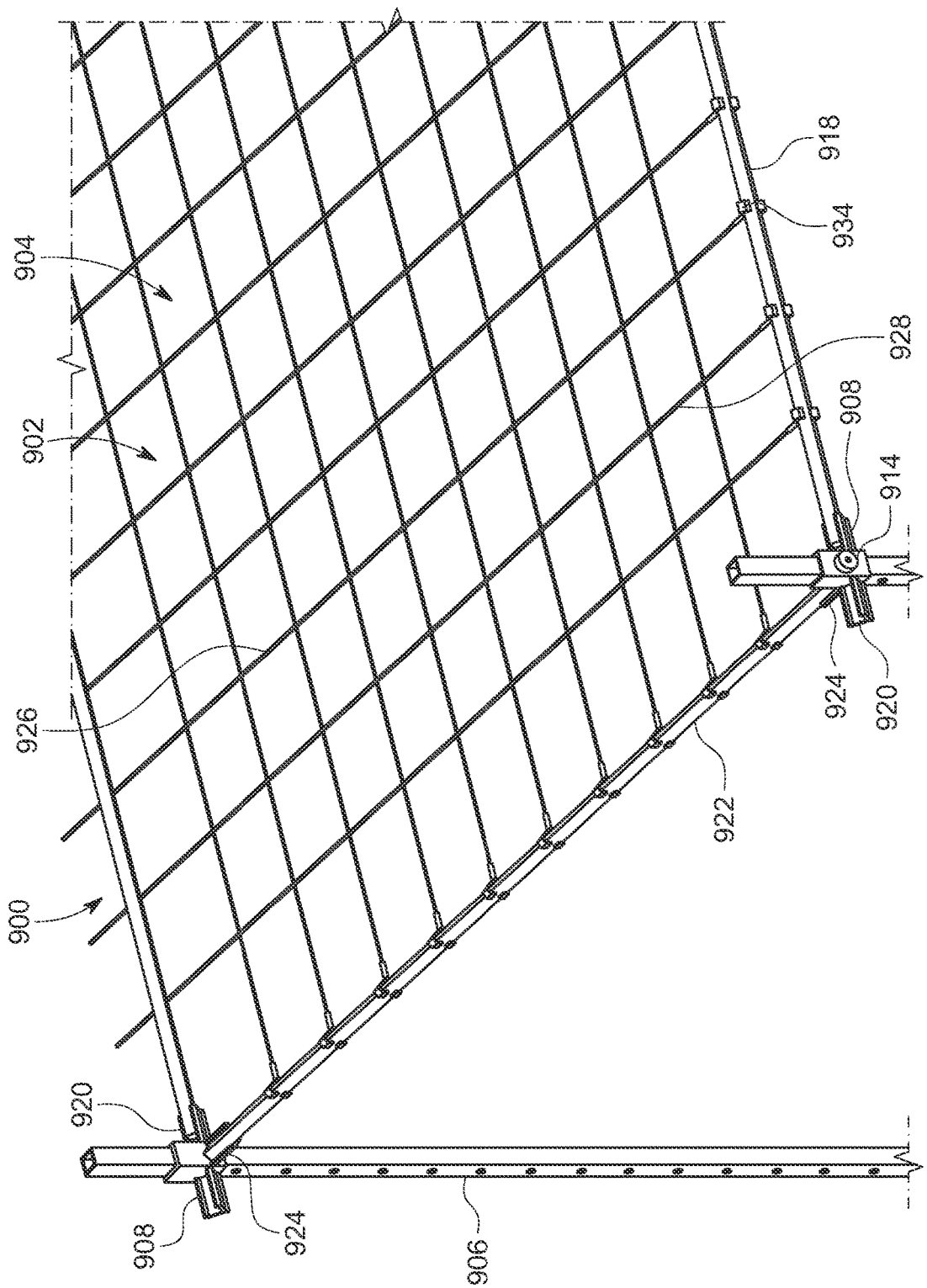
FIG. 22 is a partial top right isometric view of an embodiment of the Tray and Trellis System for the Automated Farm with Robots Working on Plants, as described herein.
Figure 23:
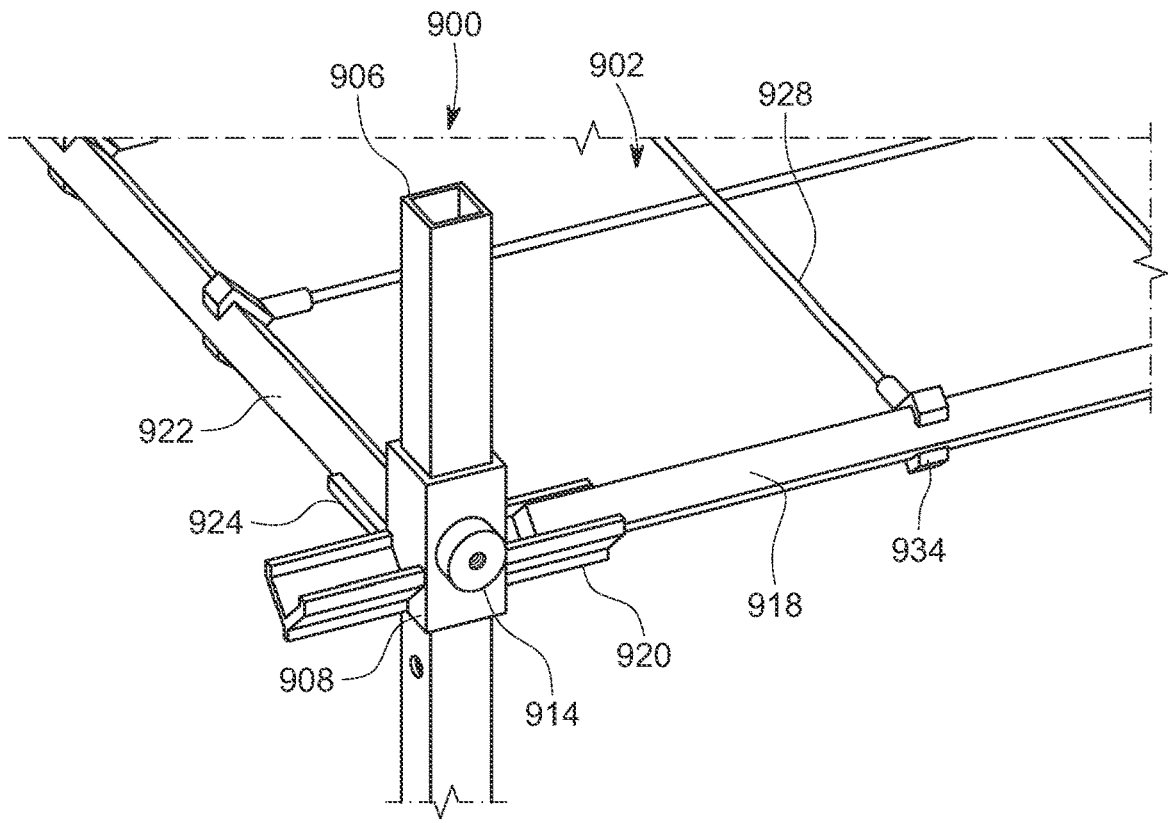
FIG. 23 is partial top right isometric view of an embodiment of the Tray and Trellis System for the Automated Farm with Robots Working on Plants, as described herein.
Figure 24:
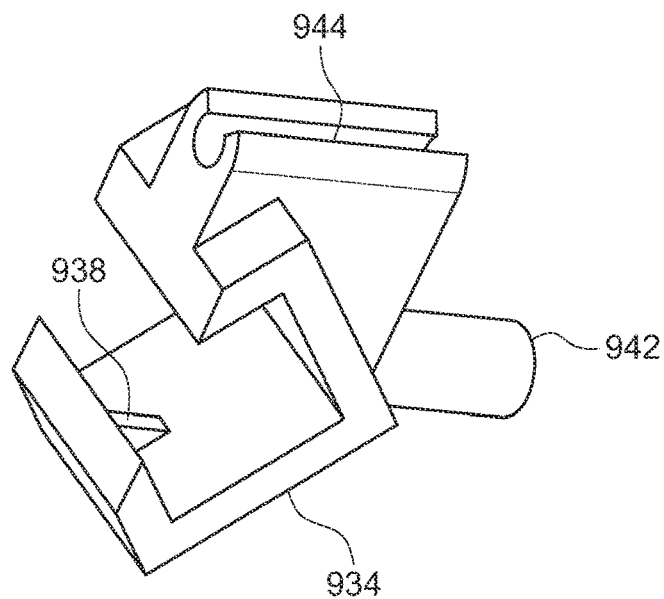
FIG. 24 is a perspective view of a clip of an embodiment of the Tray and Trellis System for the Automated Farm with Robots Working on Plants, as described herein.

Turning now to FIGS. 22, 23, and 24, another embodiment of the Tray and Trellis system 900 for the Automated Farm with Robots Working on Plants is shown. Vertical posts or legs 906 are again connected to one another by way of longitudinal members 918 and cross members 922, which longitudinal members 918 and cross members 922 may be connected to the vertical posts or legs 906 using corner or three way supports 908. Each corner or three way support 908 is again provided with longitudinal member holders 920 for supporting the longitudinal members 918, and a cross member holder 924 for supporting a cross members 922. Each corner or three way support 908 is again capable of being moved vertically along the vertical post or leg 906, and may be held in position using a thumbscrew 914. The longitudinal members 918 and cross members 922 are again provided with tines 928, the crossed tines 928 creating a trellis 902 defining a trellis grid 904.

The tines 928 are again fixed at their tine fixed ends 930 to the longitudinal members 918 on one side of the Tray and Trellis System 900, and are releasably engaged to the longitudinal members 918 at their tine tail ends 932 on the other side of the Tray and Trellis System 900. Similarly, the tines 928 are fixed to one end cross member 922 at their tine fixed ends 930, and are releasably engaged to another end cross member 922 or intermediate cross member 922 at their tine tail ends 932. Each longitudinal member 918 and cross member 922 that is fixed to the tines 928 at their tine fixed ends 930, together with the fixed tines 928 make up a comb 926. Each comb 926 can again be easily slid out of engagement with the trellis 902 by sliding the comb 926 away from the releasable engagement between the longitudinal member 918 or cross member 922 at the tine tail ends 932.

In the embodiment of the Tray and Trellis System 900 shown in FIGS. 22, 23, and 24, the tines 928 are connected to the longitudinal member 918 and cross member 922 at their tine fixed ends 930 by way of a tine clip 934. Each tine clip 934 is provided with a tine clip groove or dent engaging feature 938, which mates with one of a number of tine engaging grooves, notches, protrusions, or dents 936 (not shown) incrementally spaced along each longitudinal member 918 and cross member 922. In this way, the tine clip groove or dent engaging features 938 engage with the tine engaging grooves, notches, protrusions, or dents 936 in order to provide assistance in spacing the tines 928 along the longitudinal members 918 and/or cross members 922. Each tine clip 934 is further provided with a press-fit engagement feature 942 that snaps onto the tine fixed ends 930, attaches to the tine fixed ends 930 by way of a tapered fit, or attaches to the tine fixed ends 930 by way of another press-fit type of engagement. Each tine clip 934 is further provided with a snap-fit slot feature 944 that holds the tines 928 at their tine tail ends 932 loosely along the tines' 928 axis so that the tines 928 may be withdrawn from the snap-fit slot features 944 along the axis of the tines 928, but which snap-fit slot features 944 only allow the tines 928 to be vertically engaged or disengaged perpendicular to the tines' 928 axis by snapping the tines 928 into or out of the snap-fit slot features 944.

Figure 25:
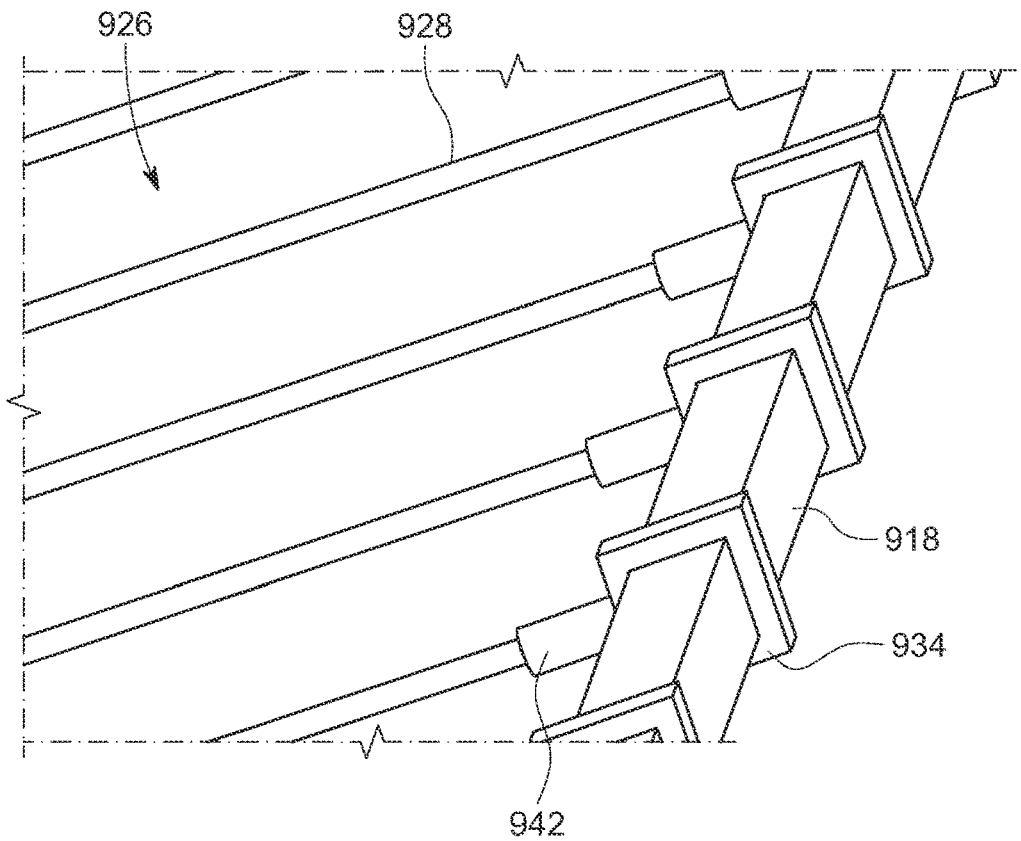
FIG. 25 is a perspective view of rings of an embodiment of the Tray and Trellis System for the Automated Farm with Robots Working on Plants, as described herein.
Figure 26:
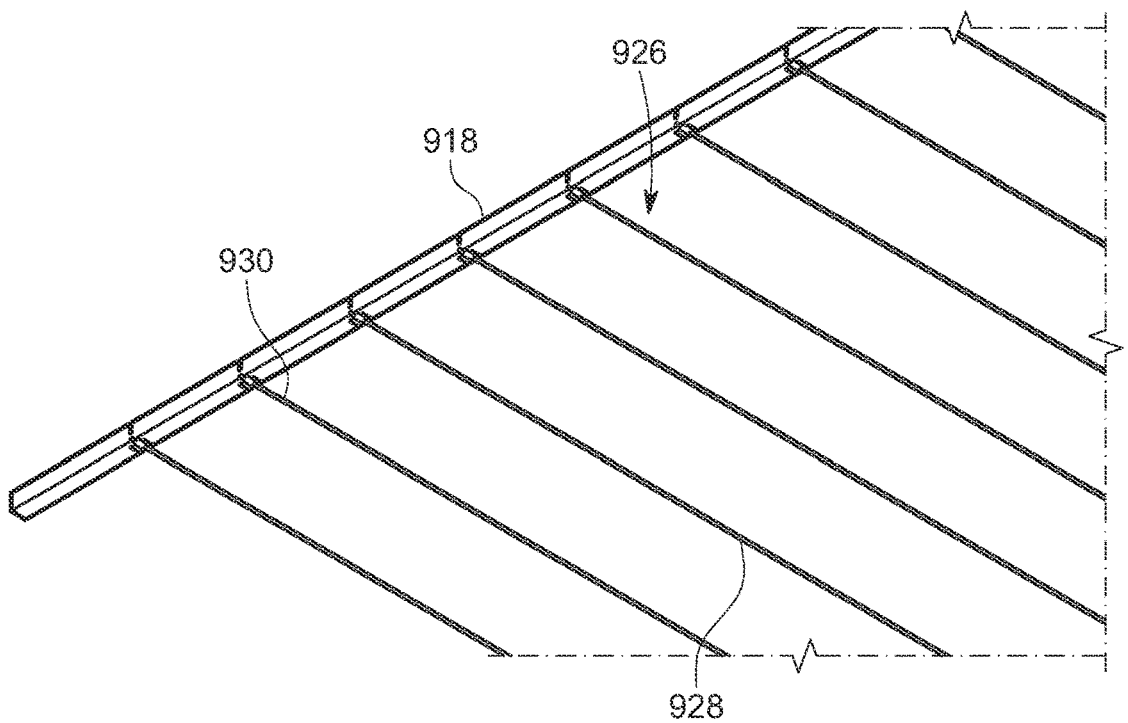
FIG. 26 is a partial perspective view of a longitudinal member of an embodiment of the Tray and Trellis System for the Automated Farm with Robots Working on Plants, as described herein.
Figure 27:
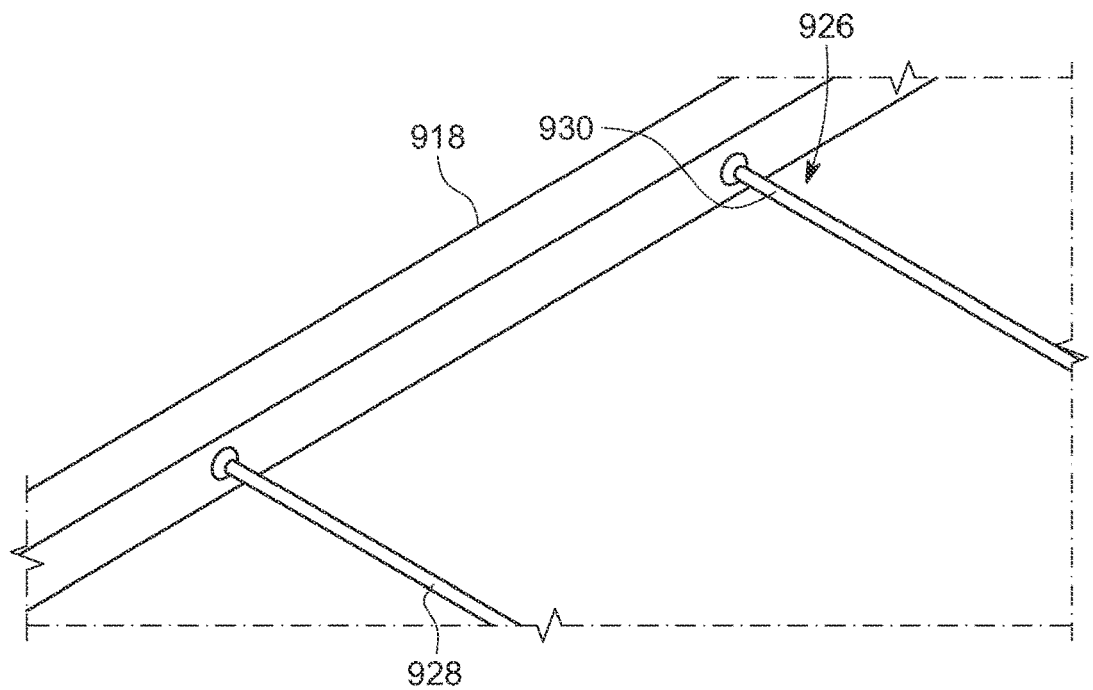
FIG. 27 is a partial perspective view of a longitudinal member of an embodiment of the Tray and Trellis System for the Automated Farm with Robots Working on Plants, as described herein.

Turning now to FIGS. 25, 26, and 27, alternate embodiments of the connections between the tine fixed ends 930 of the tines 928 and the longitudinal members 918 or cross members 922 of the Tray and Trellis System 900 are shown. In FIG. 25, the tine fixed ends 930 of the tines 928 are connected to the longitudinal members 918 (or cross members 922) using tine rings 934, thereby forming a comb 296. The fixed ends 930 of the tines 928 are fixed to the tine rings 934 using a press-fit engagement feature 942 that snaps onto the tine fixed ends 930, attaches to the tine fixed ends 930 by way of a tapered fit, or attaches to the tine fixed ends 930 by way of another press-fit type of engagement. Although not shown, each of the tine rings 934 may further be provided with a snap fit slot feature 944 for holding the a tine 928 at its tine tail end 932 loosely along the tine's 928 axis so that the tine 928 may be withdrawn from the snap-fit slot feature 944 along the axis of the tine 928, but which snap-fit slot feature 944 only allow the tine 928 to be vertically engaged or disengaged perpendicular to the tine's 928 axis by snapping the tine 928 into or out of the snap-fit slot feature 944, similar to the snap-fit slot feature 944 shown on the tine clip 934 of FIG. 24.

In the case of the alternative embodiment of the connections between the tine fixed ends 930 of the tines 928 and the longitudinal members 918 or cross members 922 of the Tray and Trellis System 900 shown in FIG. 26, the tine fixed ends 930 of the tines 928 are connected to the longitudinal members 918 or cross members 922 by way of fastening. In the case of the alternative embodiment of the connections between the tine fixed ends 930 of the tines 928 and the longitudinal members 918 or cross members 922 of the Tray and Trellis System 900 shown in FIG. 27, the tine fixed ends 930 of the tines 928 are connected to the longitudinal members 918 or cross members 922 by way of welding or bonding.

Figure 28:
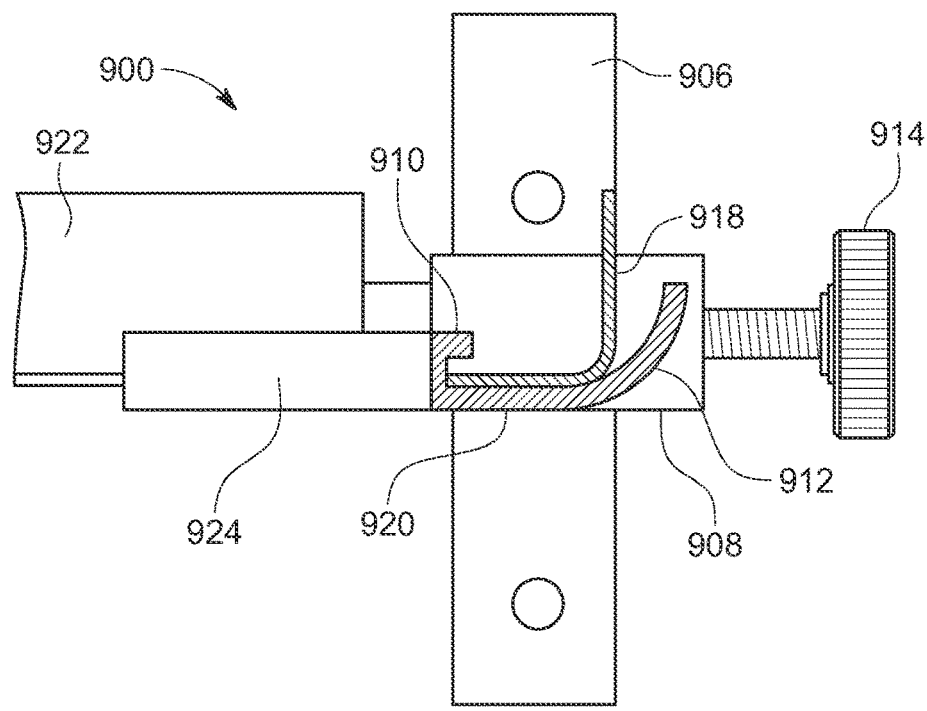
FIG. 28 is a section view of the embodiment of the Tray and Trellis System for the Automated Farm with Robots Working on Plants of FIG. 19A, as described herein.

Turning finally to FIG. 28, a section view D-D of a corner or three way support 908 of an embodiment of the Tray and Trellis system 900 taken from FIG. 19A is shown. The corner or three way support 908 is engaged with a vertical post or leg 906 of the Tray and Trellis system 900, and is held in place vertically using a thumbscrew 914 as shown, or may be held in position using a tab or other binding mechanism (not shown). The corner or three way support 908 is provided with at least one, and preferably two opposite, longitudinal member holders 920 for holding longitudinal members 918, and a cross member holder 924 for holding a cross member 922. Each longitudinal member holder 920 is provided with a curved entrance 912 and a ledge 910, by way of which the longitudinal member 918 rests upon, and is held in place and proper orientation by, the longitudinal member holder 920. Similarly, the cross member holder 924 is also provided with a curved entrance 912 and a ledge 910, by way of which the cross member 922 rests upon, and is held in place and proper orientation by, the cross member holder 924. The curved entrance 912 of each of the cross member holder 924 and the longitudinal member holders 920 is curved to allow the cross member 922 and longitudinal members 918 to be easily inserted and removed. The cross member 922 and longitudinal members 918 then hook under the ledges 910, and are held in place by the curved entrances 912, ledges 910, and gravity.

While the Tray and Trellis System for an Automated Farm with Robots Working on Plants has been described with respect to at least one embodiment, the Tray and Trellis System for an Automated Farm with Robots Working on Plants can be further modified within the spirit and scope of this disclosure, as demonstrated previously. This application is therefore intended to cover any variations, uses, or adaptations of the Tray and Trellis System for an Automated Farm with Robots Working on Plants using its general principles. Further, this application is Intended to cover such departures from the present disclosure as come within known or customary practice in the art to which the disclosure pertains and which fall within the limits of the appended claims.

REFERENCE NUMBER LISTING

10 Building with single slope roof
12 Exhaust stack

14 Exhaust blower
16 Activated Charcoal filter
18 Ozone generators
20 Attic circulation fans
22 Grow room exhaust fan
24 CO2 nozzle
26 Spray nozzle
28 Grow lights
30 Automated light rack
32 Automated light rack posts
34 Integrated screw jack
36 Split HVAC system
38 Sensors
40 Ceiling fan
42 Humidifier/dehumidifier
44 Room air filter
46 Grow room/Flower room with lights
48 Grow room/Flower room without lights
50 Preconditioned air hallway
100 Equipment and tank room
102 Clone and parent room
104 Harvest room
106 Trim and pruning room
108 Laboratory
110 Vegetation grow room
112 Flower room with lights
114 Flower room without lights
116 Air intakes
150 Parent power roller conveyor
152 Chain transfer
154 Gravity skate wheel conveyor
156 Pallet stops
158 Lift mechanism
160 Parent plant pot
200 Child conveyor tray
202 Child storage racks
204 Gravity conveyor
206 Lifting mechanism
208 Track
210 Storage and retrieval system
212 Movable shelf
214 Powered wheels
250 Grow room
252 Conveyor plant testing and watering section
254 Automated testing station
256 Conveyors
258 Hallway
260 Cross transfer
262 Conveyor frame
264 Offset splice tubes
266 Bolt-on spacer bar
268 Splice-on gusset and fish plate
270 Roller bracket
272 Two groove rollers
274 Drive belt
276 Drive rollers
278 Bearings with two hole strap
280 Set screws
282 Tapped holes
300 Tray and trellis system
302 Tray
304 Rotation holder
306 Trellis frame
308 Trellis combs
310 Trellis comb spine
312 Trellis comb ribs
350 Backlight tablet tool
352 Grip-cut tool
354 Cannabis or hemp plant
356 Room
358 Backlight tablet tool holding robot
360 Grip-cut tool holding robot
362 Trim recovery system
364 Catch tray
366 Catch tray actuator
400 Parent plant pot
402 Training system
404 Corner posts
406 Training arms
408 Adjustable clamp
450 Parent plant conveyor
452 Backlight tablet tool holding robot
454 Grip-cut tool holding robot
456 Roller conveyor turn table
458 Cannabis or hemp plant
460 Clone planting pedestal
462 Rockwool plug robot
464 pH controlled rinse tanks
466 Flex feeder
468 Tote dumper
470 Child tray
472 Child conveyor
474 Temperature and humidity controls
476 First nursery chamber
478 Second nursery chamber
480 Plant racks
482 Transporter rack
484 Transporter
486 Transplant robot
488 Conveyor
490 Gantry frame
492 Top layer pusher and scissor lift
494 Gantry head with integrated shelf
496 Preparation tanks
498 Dunnage
500 Conveyor
502 Clone preparation tank
504 Rooting hormone solution
506 Fixed blade
508 Movable blade
510 Actuator
550 Portable spray station
552 Frame
554 Wheels
556 Handle
558 Fluid tank and pump system
560 Air hose and control power cord
562 Control system
564 Spray nozzles
566 Compressor tank
600 Automated harvesting cell
602 Conveyor turntable
604 Standard conveyor section
606 Backlight tablet tool holding robot
608 Grip-cut tool holding robot
610 Trimming or pruning robot system
612 Conveyor
614 Rockwool bailer
616 Tray wash and dry system
650 Curing cabinet
652 Drawers
654 Air exchange system
656 Intake filter
658 Charcoal exhaust filter 660 Control system
700 Control system network
702 Modem
704 Farm server
706 Office PCs
708 Farm manager
710 Tech support
712 Master gardener
714 Sales
716 Ethernet
718 Cloning cell
720 Programmable logic controller
722 Human machine interface
724 Robot vision controller
726 Main programmable logic controller
728 Room controller
730 Programmable logic controller I/O
732 Human machine interface
734 Vision system
736 Hallway conveyor control
738 Programmable logic controller I/O
740 Human machine interface
750 Cannabis or hemp plant
752 Parent plant pot
754 Parent plant pot turntable
756 Pot rotating motor
758 Backlight tablet tool holding robot
760 Backlight tablet tool holding robot pedestal
762 Grip-cut tool holding robot
764 Grip-cut tool holding robot pedestal
766 Plant manipulator
768 Manipulator attachment
800 Backlight assembly
802 Backlight enclosure plate
804 Backlight backing plate
806 Backlight cover plate
808 Backlight edging
810 Backlight robot adapter extension
812 Backlight robot adapter
814 Torx flat head screw
816 Socket head cap screw
818 Backlight adapter
820 Backlight screen
850 Backlight tablet tool holding robot
852 Backlight tablet tool holding robot pedestal
854 Backlight assembly
860 Grip-cut tool
862 Plant sensor
864 Grip-cutter
866 Grip-cutter actuator
868 Cannabis or hemp plant
880 Grip-cut tool holding robot
882 Grip-cut tool holding robot pedestal
884 Grip-cut tool
900 Tray and Trellis system
902 Trellis
904 Trellis grid
906 Vertical post or leg
908 Corner or three way supports
910 Ledge
912 Curved entrance
914 Thumbscrew
916 Tab
918 Longitudinal member
920 Longitudinal member holder
922 Cross member
924 Cross member holder
926 Comb
928 Tine
930 Tine fixed end
932 Tine tail end
934 Tine clip or ring
936 Tine engaging grooves, notches, protrusions, or dents
938 Tine clip or connector groove or dent engaging feature
940 Open grommet
942 Press-fit engagement feature
944 Snap fit slot feature

What is claimed is:

1. An automated farm having a tray and trellis system, the tray and trellis system comprising:
at least one vertical post or leg;
at least two longitudinal members including a first longitudinal member and a second longitudinal member;
at least two cross members including a first cross member and a second cross member;
at least one first comb comprised of multiple tines fixed at one end to the first longitudinal member on one side of the tray and trellis system;
the multiple tines being releasably engaged at their other end to the second longitudinal member on the other side of the tray and trellis system;
at least one second comb comprised of multiple additional tines fixed at one end to the first cross member at one end of the tray and trellis system; and
the multiple additional tines being releasably engaged at their other end to a the second cross member at the other end of the tray and trellis system,
wherein each comb is configured to be removable to easily remove plants thereon without harming the plants by:
grasping the first longitudinal member or the first cross member; and
pulling the first longitudinal member or the first cross member horizontally, in a direction away from the releasably engaged ends of the tines and toward the fixed ends of the tines, to disengage the releasably engaged ends of the tines, thereby removing the first longitudinal member or the first cross member and the tines attached thereto as a unit.

2. The automated farm of claim 1, wherein:
the fixed ends of the tines being permanently fixed to the first longitudinal member or the first cross member by at least one of welding, bonding, fastening, and molding as a single piece.

3. The automated farm of claim 1, wherein:
the fixed ends of the tines being fixed to the first longitudinal member or the first cross member by way of clips that connect to the fixed ends of the tines by snapping onto the fixed ends of the tines, by tapered fit with the fixed ends of the tines, or by press-fit engagement with the fixed ends of the tines.

4. The automated farm of claim 3, wherein:
the clips each being provided with at least one groove, notch, protrusion, or dent engageable with the first longitudinal member or the first cross member.

5. The automated farm of claim 4, wherein:
the clips are arranged at one inch increments along the first longitudinal member or the first cross member.

6. The automated farm of claim 3, wherein:
the releasably engaged ends of the tines each being engaged with snap-fit slot features incorporated into the clips; and
the snap-fit slot features being configured to hold the releasably engaged ends of the tines loosely along the tines' longitudinal axis, but to only allow each of the releasably engaged ends of the tines to be engaged or disengaged with the snap-fit slot features vertically perpendicular to the tines' longitudinal axis by snapping each of the releasably engaged ends of the tines into or out of the snap-fit slot features.

7. The automated farm of claim 1, wherein:
the releasably engaged ends of the tines being engaged with open grommets that are inserted into openings in at least one of the second longitudinal member and the second cross member;
the open grommets each having a laterally perpendicular opening;
the openings in the at least one of the second longitudinal member and the second cross member each having each a narrow neck and wide recess; and
the open grommets being configured to hold the releasably engaged ends of the tines loosely along the tines' longitudinal axis, but to only allow each of the releasably engaged ends of the tines to be engaged or disengaged with the open grommets vertically perpendicular to the tines' longitudinal axis by snapping each of the releasably engaged ends of the tines into or out of the open grommets through the laterally perpendicular openings.

8. The automated farm of claim 7, wherein:
the wide recesses being provided with a shape that minimizes rotation of the open grommet, so that the laterally perpendicular openings in the grommets remain aligned with the narrow necks of the openings in the at least one of the second longitudinal member and the second cross member.

9. The automated farm of claim 1, further comprising:
at least one three way support connecting at least one of the longitudinal members and the cross members to the at least one vertical post or leg;
the at least one three way support being operable to slide up and down the at least one vertical post or leg; and
a thumbscrew being operable to fix the at least one three way support in place along the length of the at least one vertical post or leg.

10. The automated farm of claim 9, wherein:
the at least one three way support is provided with at least one longitudinal member holder for supporting a respective longitudinal member of the at least two longitudinal members, and at least one cross member holder for supporting a respective cross member of the at least two cross members;
each longitudinal member holder being provided with a curved entrance and a ledge configured to admit and hold in place and proper orientation the respective longitudinal member; and
each cross member holder being provided with a curved entrance and a ledge configured to admit and hold in place and proper orientation the respective cross member.

11. A tray and trellis system of an automated farm, comprising:
at least one vertical post or leg;
at least two longitudinal members including a first longitudinal member and a second longitudinal member;
at least two cross members including a first cross member and a second cross member;
at least one first comb comprised of multiple tines fixed at one end to the first longitudinal member on one side of the tray and trellis system;
the multiple tines being releasably engaged at their other end to the second longitudinal member on the other side of the tray and trellis system;
at least one second comb comprised of multiple additional tines fixed at one end to the first cross member at one end of the tray and trellis system; and
the multiple additional tines being releasably engaged at their other end to the second cross member at the other end of the tray and trellis system,
wherein each comb is configured to be removable to easily remove plants thereon without harming the plants by:
grasping the first longitudinal member or the first cross member; and
pulling the first longitudinal member or the first cross member horizontally, in a direction away from the releasably engaged ends of the tines and toward the fixed ends of the tines, to disengage the releasably engaged ends of the tines, thereby removing the first longitudinal member or the first cross member and the tines attached thereto as a unit.

12. The tray and trellis system of claim 11, wherein:
the fixed ends of the tines being permanently fixed to the first longitudinal member or the first cross member by at least one of welding, bonding, fastening, and molding as a single piece.

13. The tray and trellis system of claim 11, wherein:
the fixed ends of the tines being fixed to the first longitudinal member or the first cross member by way of clips that connect to the fixed ends of the tines by snapping onto the fixed ends of the tines, by tapered fit with the fixed ends of the tines, or by press-fit engagement with the fixed ends of the tines.

14. The tray and trellis system of claim 13, wherein:
the clips each being provided with at least one groove, notch, protrusion, or dent engageable with the first longitudinal member or the first cross member.

15. The tray and trellis system of claim 14, wherein the clips are arranged at one inch increments along the first longitudinal member or the first cross member.

16. The tray and trellis system of claim 13, wherein:
the releasably engaged ends of the tines each being engaged with snap-fit slot features incorporated into the clips; and
the snap-fit slot features being configured to hold the releasably engaged ends of the tines loosely along the tines' longitudinal axis, but to only allow each of the releasably engaged ends of the tines to be engaged or disengaged with the snap-fit slot features vertically perpendicular to the tines' longitudinal axis by snapping each of the releasably engaged ends of the tines into or out of the snap-fit slot features.

17. The tray and trellis system of claim 11, wherein:
the releasably engaged ends of the tines being engaged with open grommets that are inserted into openings in at least one of the second longitudinal member and the second cross member;
the open grommets each having a laterally perpendicular opening;
the openings in the at least one of the second longitudinal member and the second cross member each having a narrow neck and wide recess; and
the open grommets being configured to hold the releasably engaged ends of the tines loosely along the tines' longitudinal axis, but to only allow each of the releasably engaged ends of the tines to be engaged or disengaged with the open grommets vertically perpendicular to the tines' longitudinal axis by snapping each of the releasably engaged ends of the tines into or out of the open grommets through the laterally perpendicular openings.

18. The tray and trellis system of claim 17, wherein
the wide recesses being provided with a shape that minimizes rotation of the open grommet, so that the laterally perpendicular openings in the grommets remain aligned with the narrow necks of the openings in the at least one of the second longitudinal member and the second cross member.

19. The tray and trellis system of claim 11, further comprising:
at least one three way support connecting at least one of the longitudinal members and the
cross members to the at least one vertical post or leg;
the at least one three way support being operable to slide up and down the at least one vertical post or leg; and
a thumbscrew being operable to fix the at least one three way support in place along the length of the at least one vertical post or leg.

20. The tray and trellis system of claim 19, wherein:
the at least one three way support is provided with at least one longitudinal member holder for supporting a respective longitudinal member of the at least two longitudinal members, and at least one cross member holder for supporting a respective cross member of the at least two cross members;
each longitudinal member holder being provided with a curved entrance and a ledge configured to admit and hold in place and proper orientation the respective longitudinal member; and
each cross member holder being provided with a curved entrance and a ledge configured to admit and hold in place and proper orientation the respective cross member.

* * * * *